US006788722B1

(12) United States Patent
Kennedy et al.

(10) Patent No.: US 6,788,722 B1
(45) Date of Patent: Sep. 7, 2004

(54) HIGH POWER WAVEGUIDE LASER

(75) Inventors: John T. Kennedy, Suffield, CT (US); Richard A. Hart, North Granby, CT (US); Leon A. Newman, Glastonbury, CT (US); Anthony J. DeMaria, West Hartford, CT (US)

(73) Assignee: Coherent, Inc., Santa Clara, CA (US)

( * ) Notice: Subject to any disclaimer, the term of this patent is extended or adjusted under 35 U.S.C. 154(b) by 268 days.

(21) Appl. No.: 09/612,733

(22) Filed: Jul. 10, 2000

(51) Int. Cl.[7] .............................................. H01S 3/22
(52) U.S. Cl. ........................... 372/64; 372/55; 372/61; 372/81; 372/87
(58) Field of Search ............................ 372/55, 61, 64, 372/81, 87, 95

(56) References Cited

U.S. PATENT DOCUMENTS

| | | | |
|---|---|---|---|
| 3,772,611 A | * 11/1973 | Smith ........................ 372/96 |
| 3,982,204 A | * 9/1976 | Andringa .................... 372/61 |
| 4,064,465 A | 12/1977 | Hundstad et al. .......... 331/94.5 |
| 4,169,251 A | * 9/1979 | Laakmann ................... 372/64 |
| 4,363,126 A | 12/1982 | Chenausky et al. |
| 4,438,514 A | * 3/1984 | Chenausky et al. .......... 372/64 |
| 4,493,087 A | 1/1985 | Laakman et al. ............ 372/64 |
| 4,577,323 A | 3/1986 | Newman et al. ............. 372/64 |
| 4,662,958 A | * 5/1987 | Conder et al. ........... 156/89.17 |
| 4,719,639 A | 1/1988 | Tulip |
| 4,787,090 A | 11/1988 | Newman et al. |
| 4,807,233 A | 2/1989 | Hart et al. .................. 372/18 |
| 4,807,234 A | 2/1989 | Hart et al. .................. 372/18 |
| 4,815,094 A | * 3/1989 | Cantoni ...................... 372/93 |
| 4,837,769 A | 6/1989 | Chandra et al. ............. 372/41 |
| 4,870,654 A | 9/1989 | Cantoni et al. ............. 372/93 |
| 4,891,819 A | 1/1990 | Sutter, Jr. et al. |
| 4,939,738 A | * 7/1990 | Opower ....................... 372/95 |
| 4,956,847 A | 9/1990 | Terai et al. ................. 372/87 |
| 5,177,748 A | 1/1993 | Zhang |
| 5,220,576 A | 6/1993 | Krueger et al. |
| 5,321,717 A | 6/1994 | Adachi et al. ............. 372/100 |
| 5,353,297 A | 10/1994 | Koop et al. ................. 372/64 |

(List continued on next page.)

FOREIGN PATENT DOCUMENTS

WO  WO 98/40939  9/1998

OTHER PUBLICATIONS

PCT Written Opinion Under PCT Rule 66 for International application No. PCT/US01/21426, International filing date of Jul. 6, 2001.

(List continued on next page.)

*Primary Examiner*—Don Wong
*Assistant Examiner*—Cornelius H. Jackson
(74) *Attorney, Agent, or Firm*—Stallman & Pollock LLP

(57) ABSTRACT

The above discussed and other drawbacks and deficiencies of the prior art are overcome or alleviated by a laser of the present invention. In accordance with the present invention the laser comprises a housing defining a plurality of compartments therein, a folded waveguide disposed within the housing, the folded waveguide defining a plurality of channels having a substantially rectangular cross section for guiding a laser beam, a plurality of electrodes disposed in the plurality of compartments and juxtaposed along opposite surfaces of the waveguide and at least one power supply connected to the plurality of electrodes. The channels having a prescribed width to height ratio for a prescribed channel length for a given Fresnel number. At least one optical housing is provided. The optical housing is mounted to the laser housing, the optical housing including a plurality of beam turning mechanisms disposed within a plurality of compartments accessible for adjusting the beam turning mechanisms. The channels are disposed within the waveguide so as to subtend a prescribed angular orientation between adjacent channels. Inductors are provided for suppressing the capacitance of the electrodes.

13 Claims, 28 Drawing Sheets

U.S. PATENT DOCUMENTS

| | | | | |
|---|---|---|---|---|
| 5,467,362 A | | 11/1995 | Murray | 372/5 |
| 5,491,579 A | * | 2/1996 | Justus | 359/241 |
| 5,508,851 A | | 4/1996 | Tachizawa | 359/822 |
| 5,600,668 A | * | 2/1997 | Erichsen | 372/87 |
| 5,610,936 A | | 3/1997 | Cantoni | |
| 5,654,782 A | * | 8/1997 | Morokawa | 349/143 |
| 5,663,980 A | | 9/1997 | Adachi | 372/108 |
| 5,740,195 A | * | 4/1998 | Murray et al. | 372/87 |
| 5,748,663 A | | 5/1998 | Chenausky | |
| 5,881,087 A | * | 3/1999 | Sukhman | 372/61 |
| 5,953,360 A | * | 9/1999 | Vitruk et al. | 372/87 |
| 6,192,061 B1 | * | 2/2001 | Hart et al. | 372/64 |

OTHER PUBLICATIONS

"Review CW High Power CO2 Lasers", Anthony J. DeMaria, Proceeding of the IEEE, vol. 61, pp. 731–745 (1973).

"Power Scaling of Laser Area Transverse RF Discharge CO2 Lasers", Abramski, et al., Applied Physics Letter, vol. 54, pp. 1833–1835 (1989).

"BeO Capillary CO2 Waveguide Laser", Bukhardt, et al., Optics Communications, vol. 6, pp. 193–195 (Oct. 1972).

"Hollow Metalic and Dielectric Wave–guides for Long Distance Optical Transmission and Lasers", Marcatili, et al., Bell System Technical Journal, vol. 43, pp. 1783–1809 (1964).

"Lasers", Anthony E. Siegman, University Science Books, pp. 712–727 (1788).

"Reflection Polarizers for the vacuum ultraviolet using Al + MgF2 mirrors and an MgF2 plate", Hass, et al., Applied Optics, vol. 17, Jan. 1, 1978.

"Polarization Studies in the Vacuum Ultraviolet", Hamm, et al., Journal of the Optical Society of America, vol. 55, No. 11, pp 1460–1463 (1965).

"Reflective device for polarization rotation", Greninger, Applied Optics, vol. 27, No. 4, pp 774–776 (1988).

"Radiofrequency–Discharge–Excited CO2 Lasers", Hall, et al., pp. 165–258.

Article by L.E. Ross, 17.4 "Folded CO2 Waveguide Lasers", pp. 227–231.

Article by P.E. Jackson et al "Comparisons Of Waveguide Folding Geometries in a CO2 z–fold laser", Applied Optics, vol. 28, No. 5, pp. 935–941.

* cited by examiner

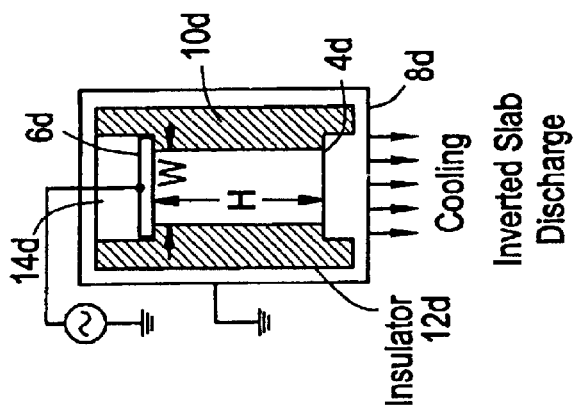
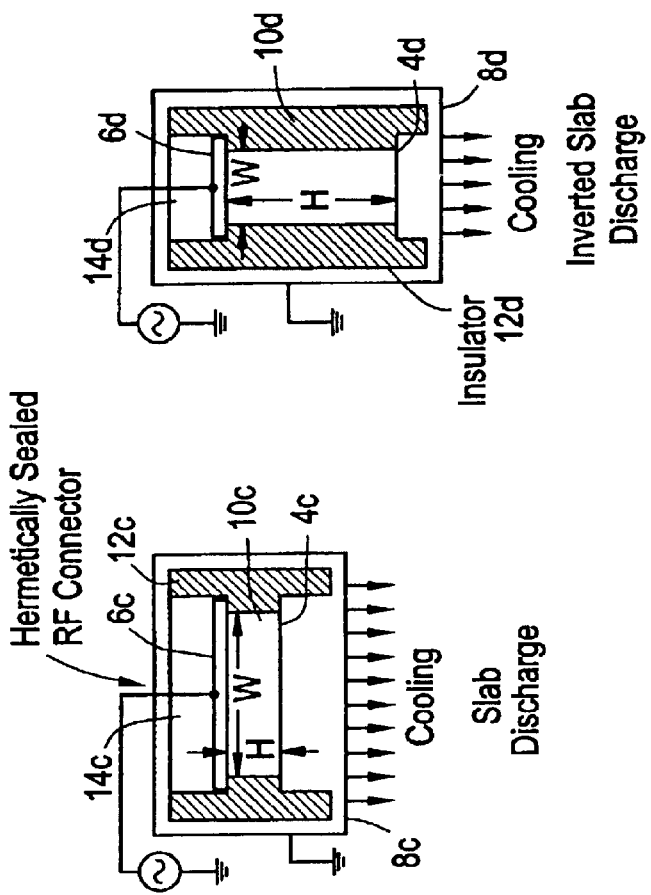
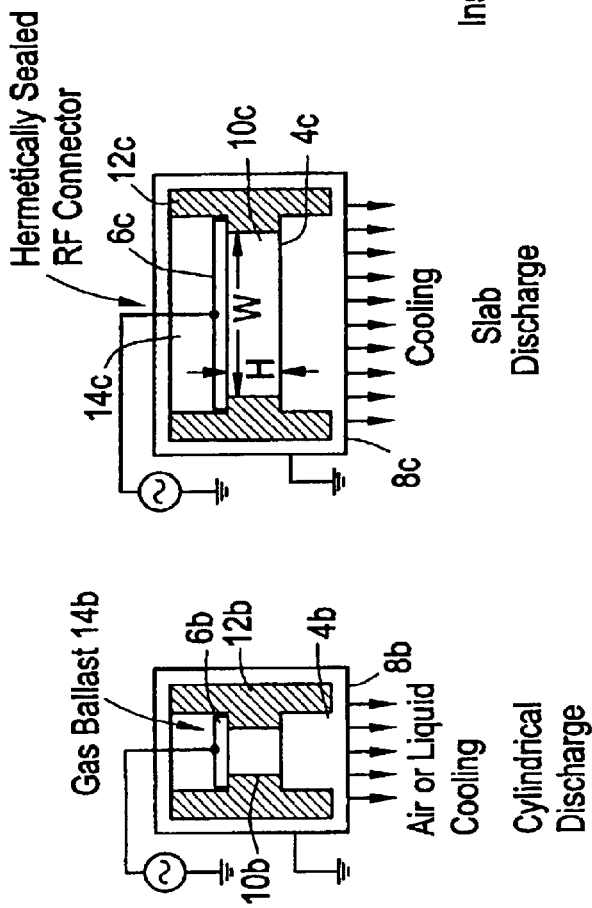
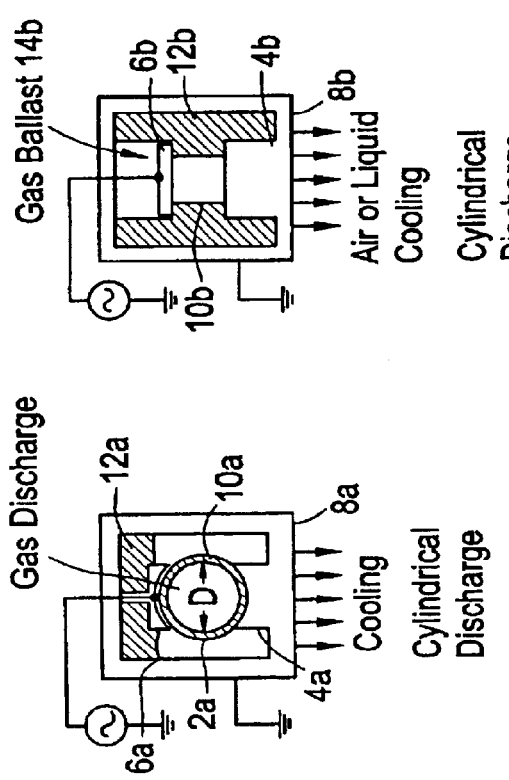

FIG. 2A
PRIOR ART
FIG. 2B
PRIOR ART
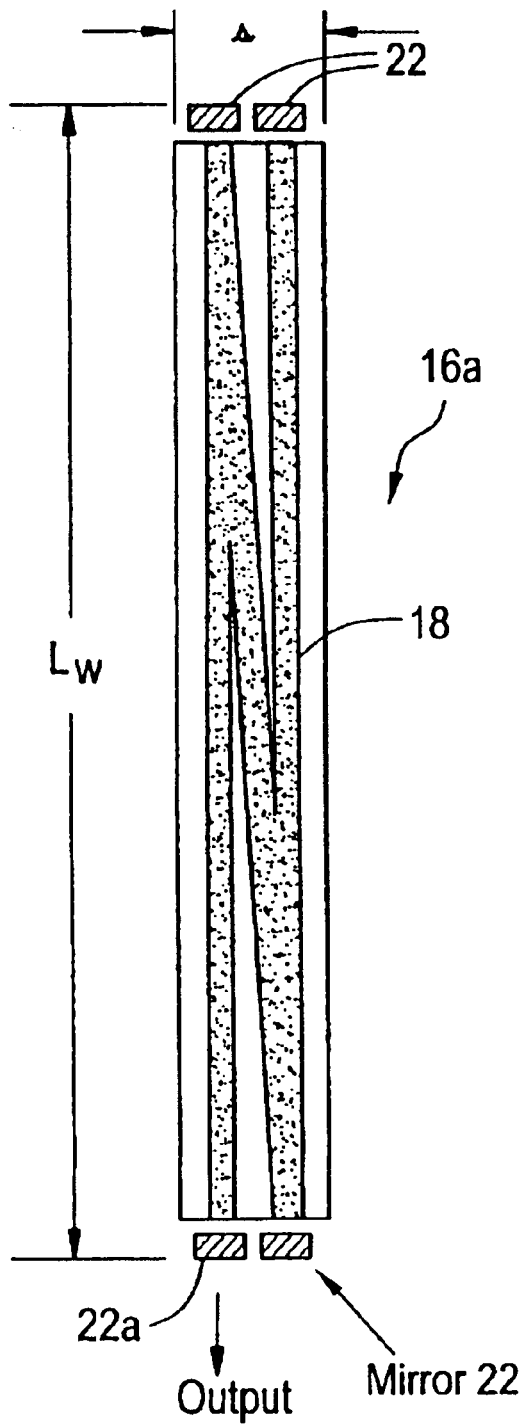
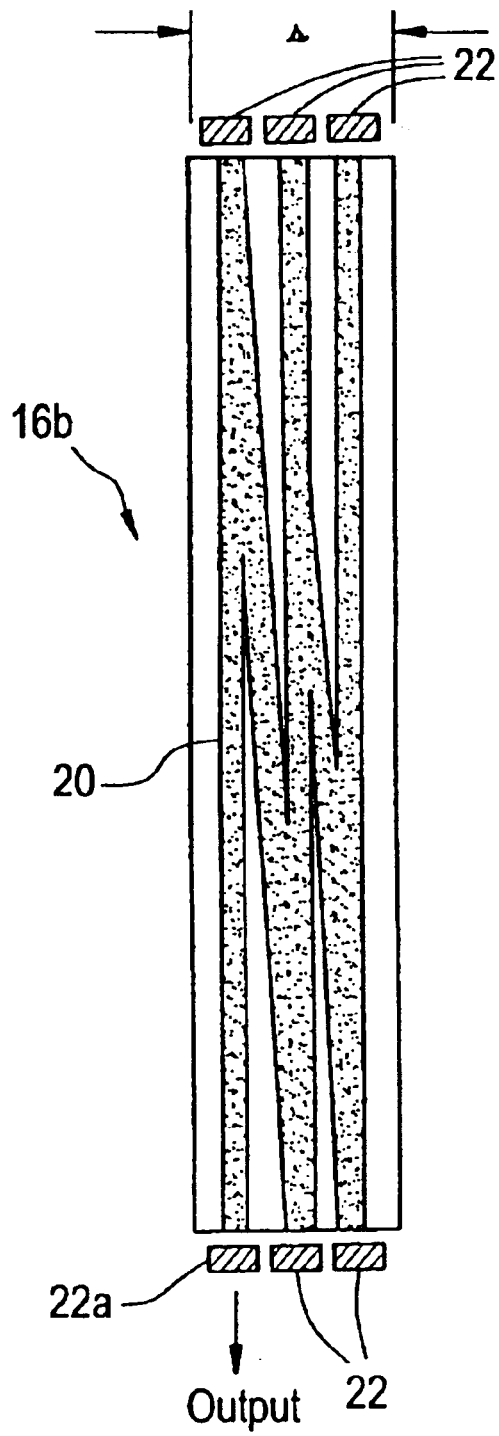

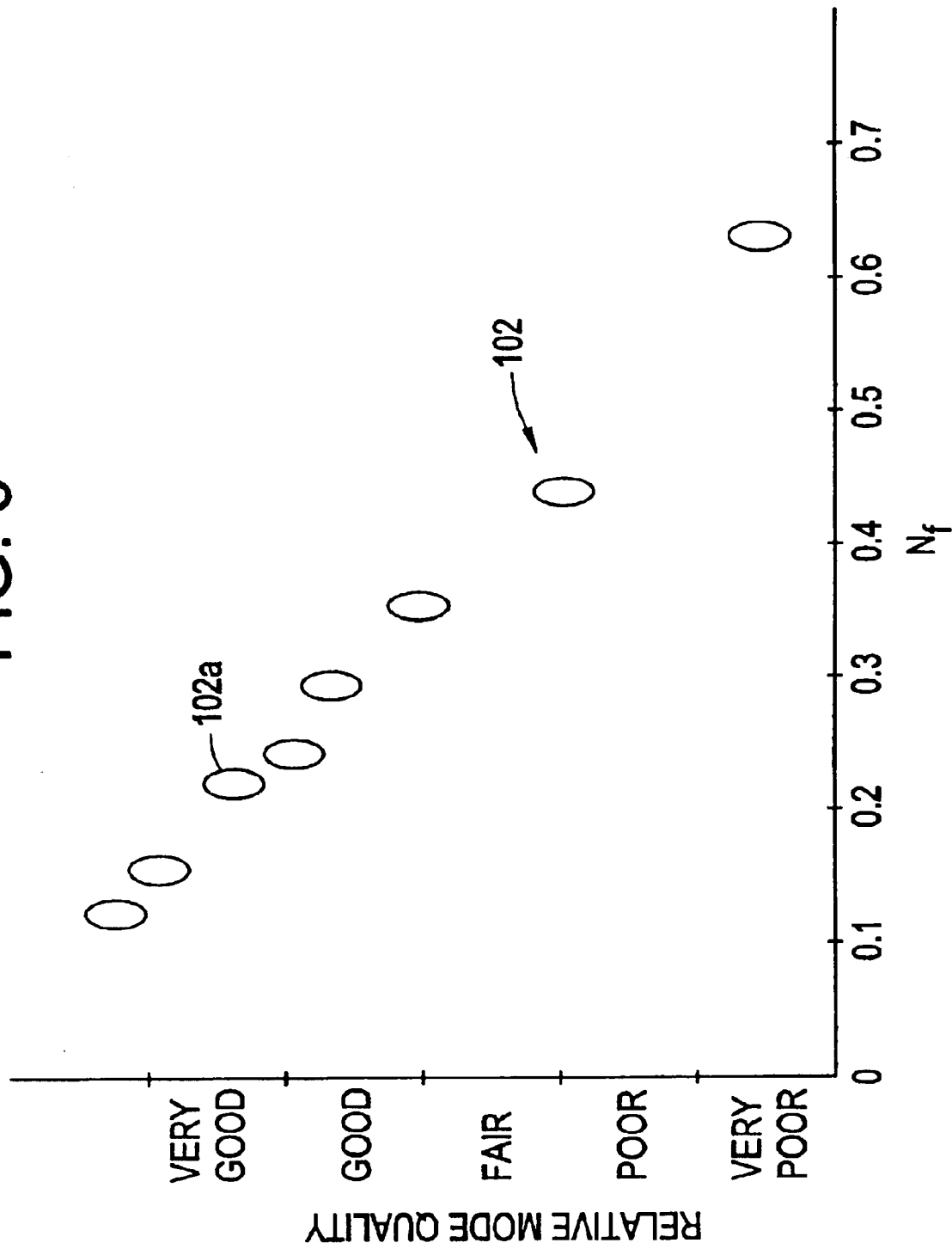

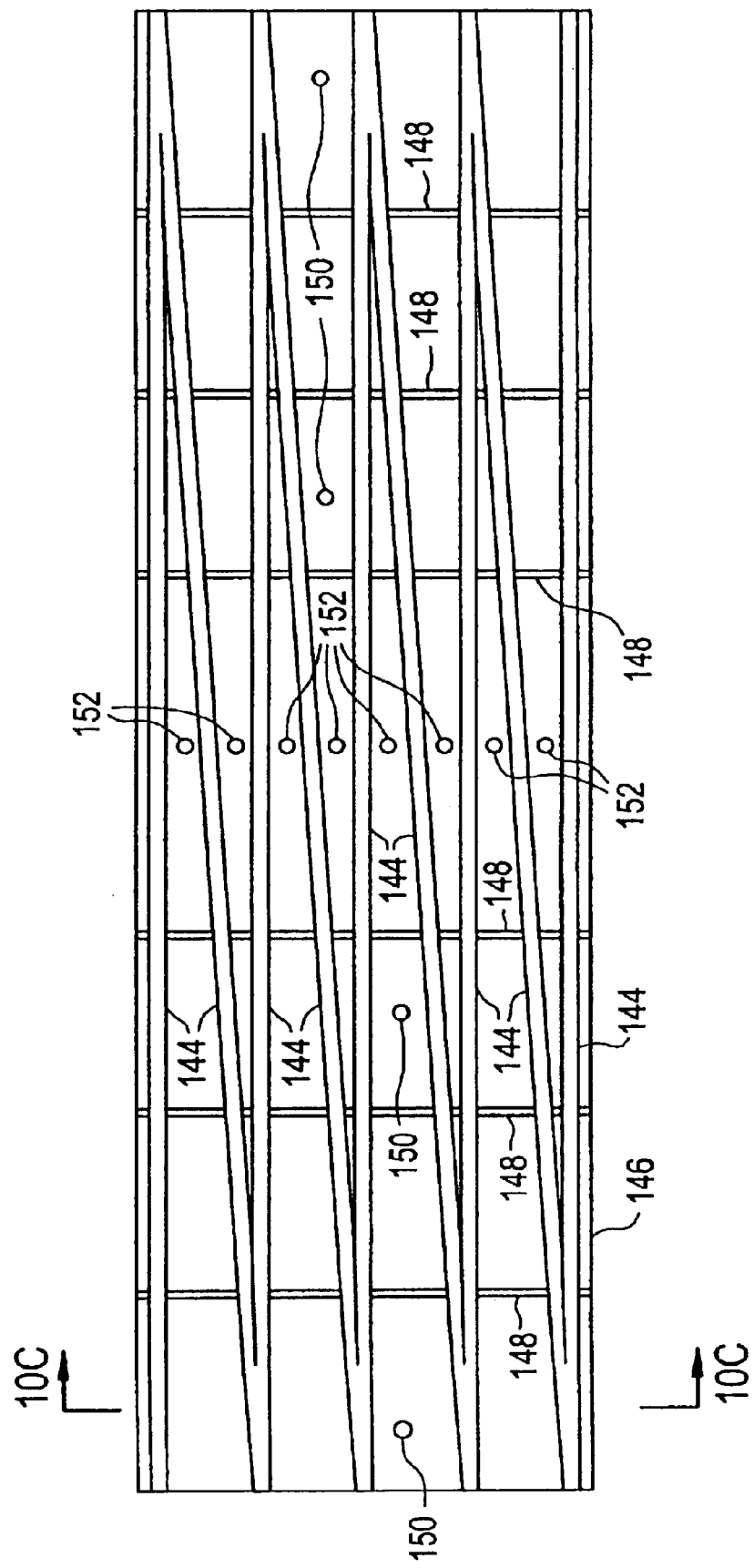

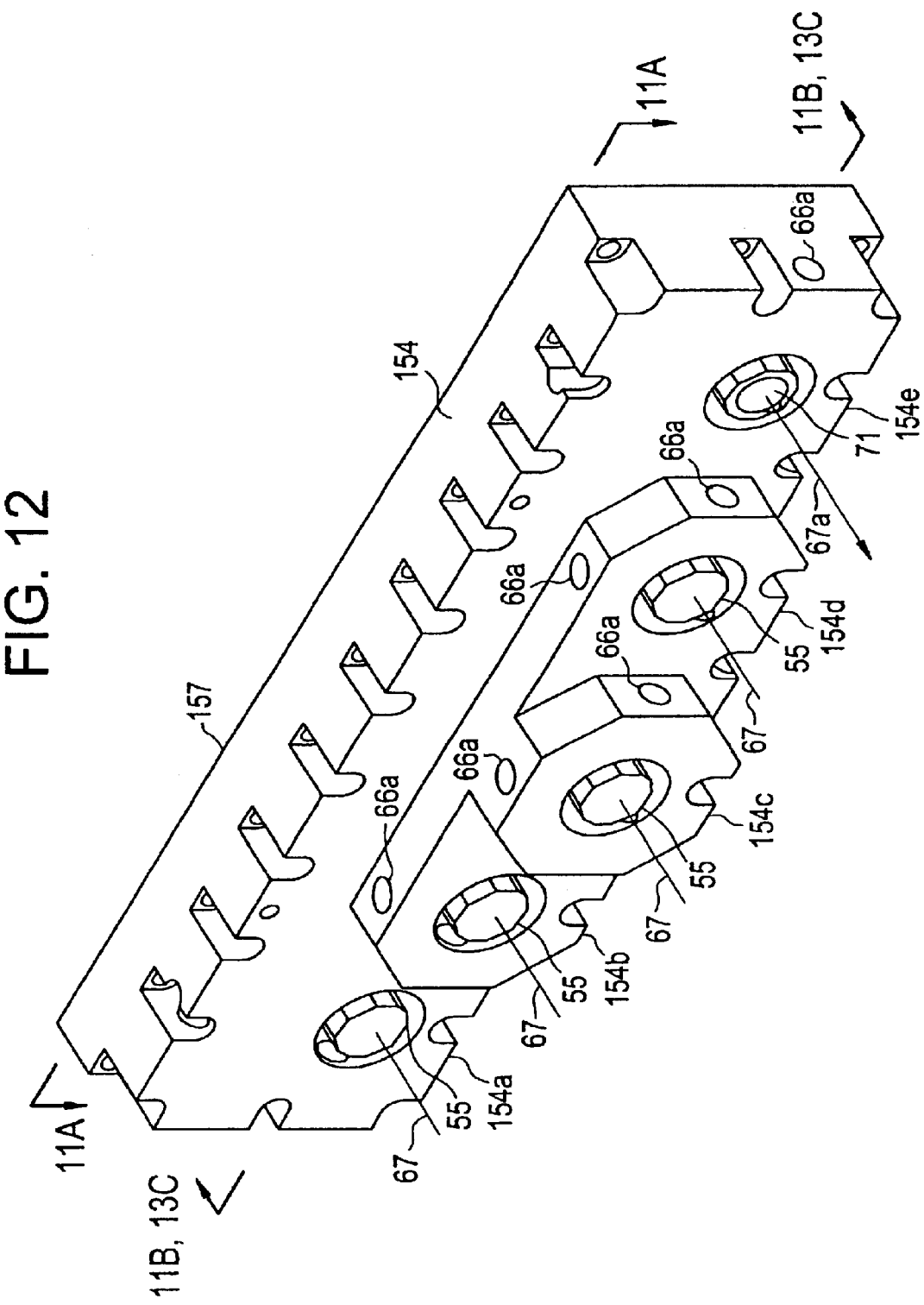

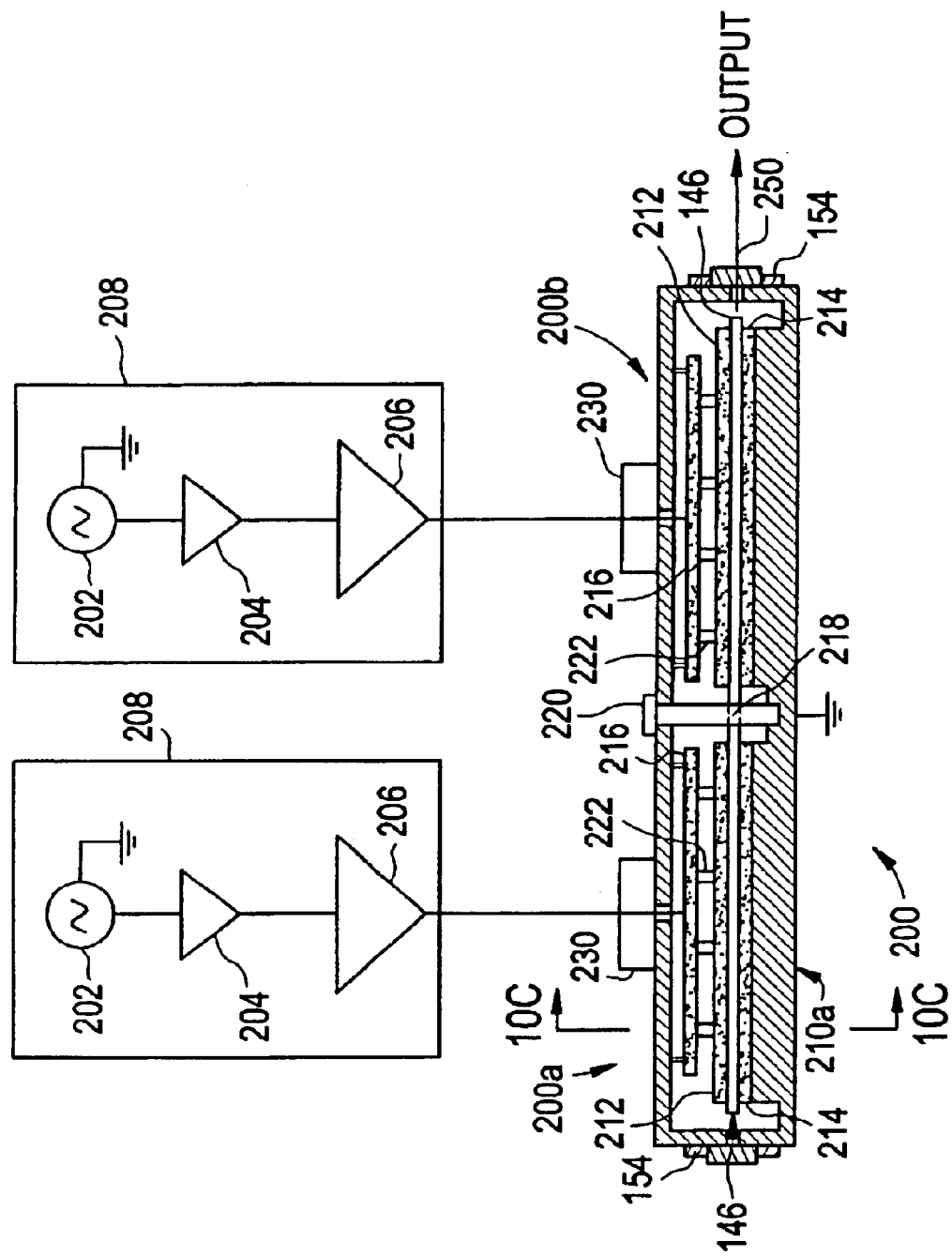

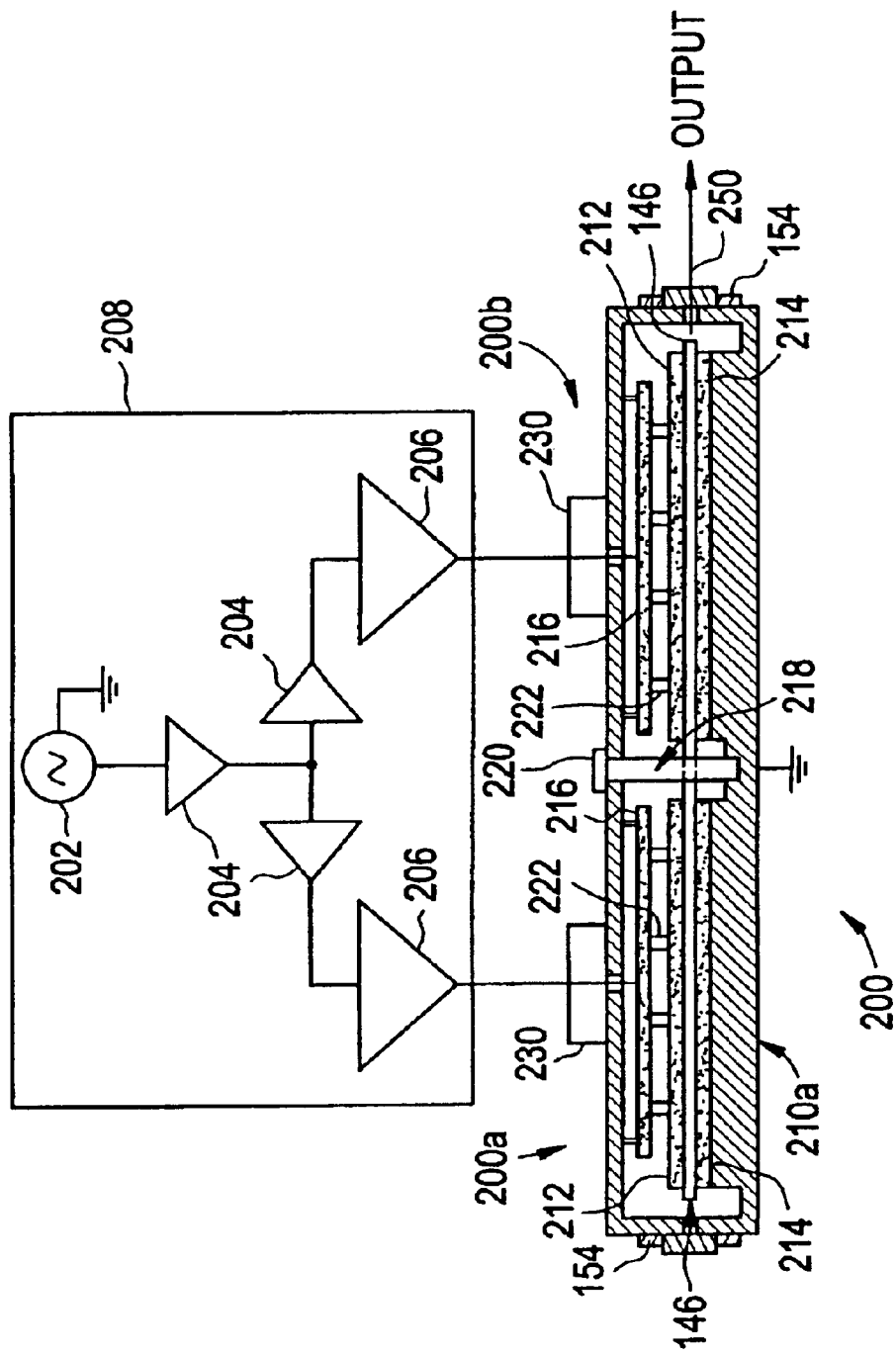

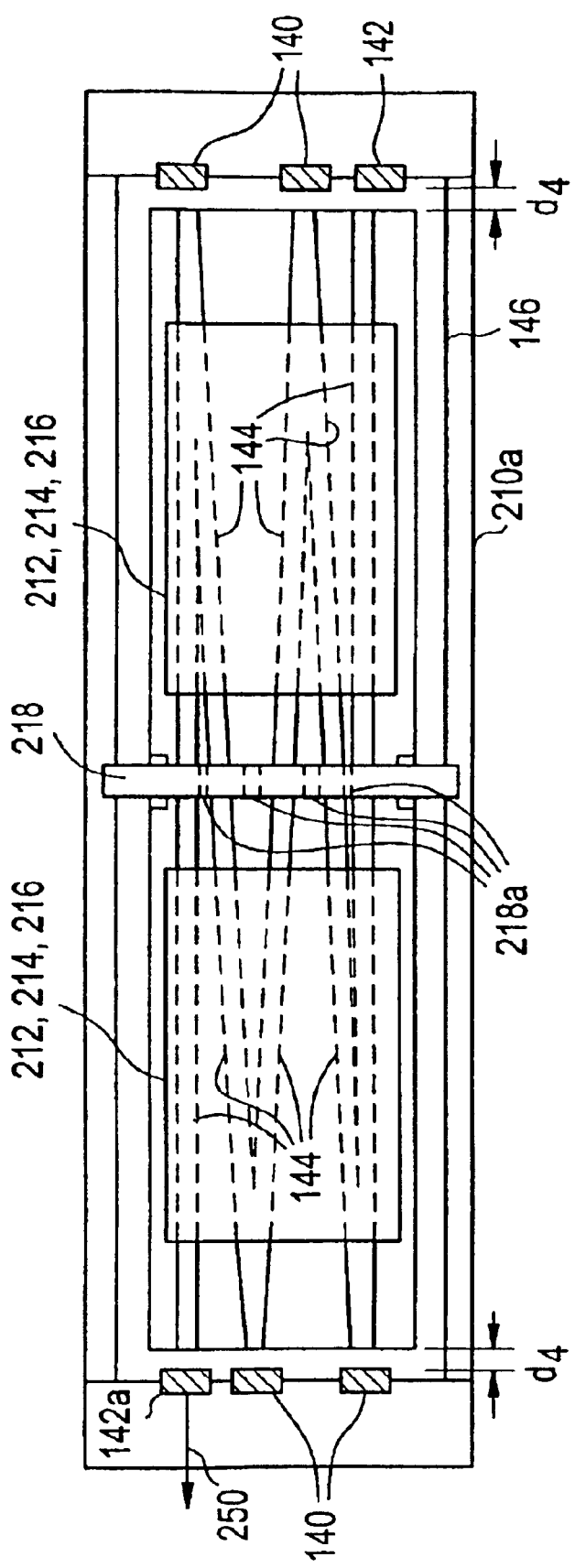

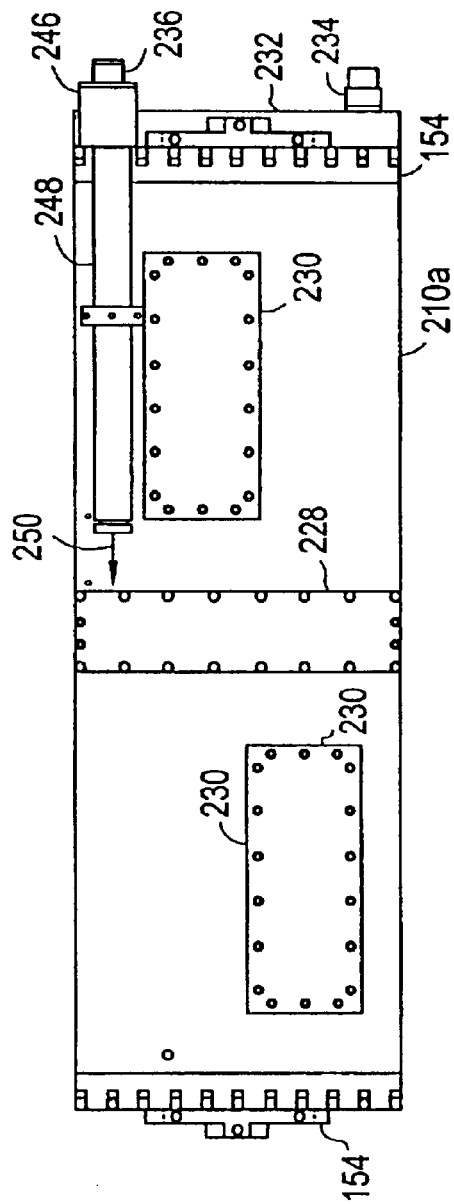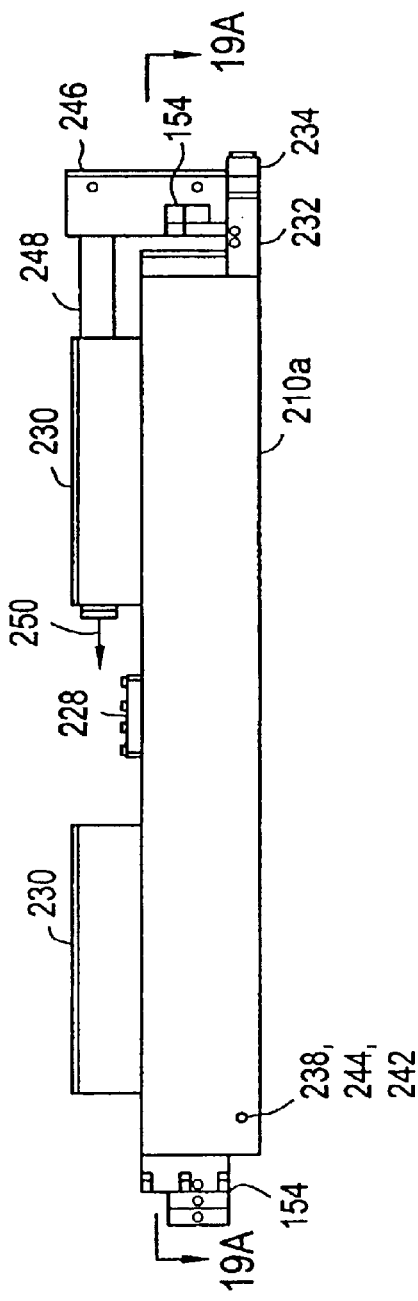

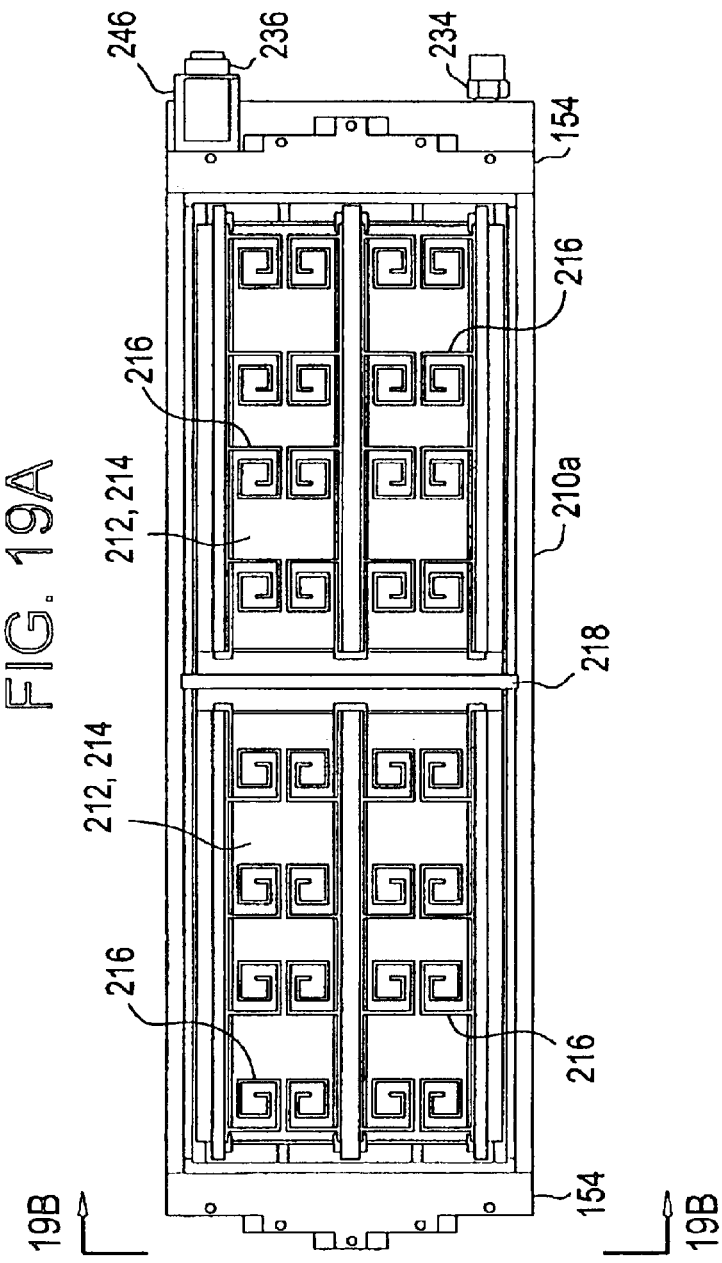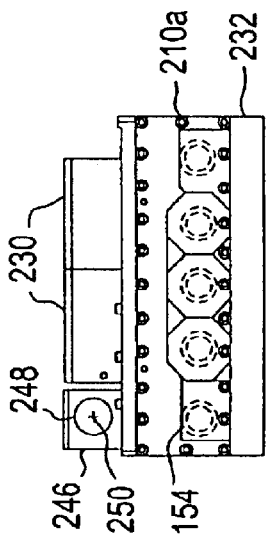

HIGH POWER WAVEGUIDE LASER

BACKGROUND OF THE INVENTION

1. Field of the Invention

This invention relates to a method and system for increasing the output power of gas lasers and more particularly to increasing the output power of sealed-off, diffusion cooled, $CO_2$ waveguide lasers utilizing radio frequency (RF) excitation

2. Prior Art

The output power per unit cross sectional area for diffusion cooled $CO_2$ lasers scales inversely as the square of the diameter of the discharge region and directly with the product of the mean free path and the thermo molecular speed of the $CO_2$ molecules within the discharge region. $CO_2$ diffusion cooled lasers have the advantages of smaller, size, longer sealed-off life time, and lower maintenance requirements below 500 to 1000 W of output power; while convectively cooled lasers, utilizing the fast flowing of the gas through the discharge region, have the advantage of higher power output capability ranging up to several tens of thousands of watts. When the product of the discharge diameter and the gas flow velocity is smaller than the product of the mean free path and the thermo molecular speed of the $CO_2$ molecule within the discharge, higher power output per cross sectional area of the discharge is obtained with diffusion cooled lasers than with convectively cooled laser. (Review of CW High Power $CO_2$ Laser, by Anthony J. DeMaria, Proceeding of the IEEE, pages 731 to 748 June 1973, which is incorporated herein by reference).

It is well know that diffusion cooled lasers utilize the collision of gas molecules, which have given up photons into the laser feedback cavity by stimulated emission but have not been completely de-excited to the ground state, with the walls of the housing containing the discharge to cool the gas within the discharge by de-exciting them to the ground state. This is especially true with $CO_2$ molecules in typical $CO_2$:$N_2$:He discharges used in $CO_2$ lasers. These wall collisions de-excite these $CO_2$ molecules that have contributed a photon to the laser process down to the ground state, thereby cooling the discharge. The discharge containing housing is in turn cooled externally by either liquid or air cooling techniques. Air-cooling is utilized for lower power lasers that typically operate below 50 Watts of output power. It is known that if the cross section of the gas discharge section is large, the time required for $CO_2$ molecules, e.g., in the center of the discharge, to diffuse to the cooled walls and became de-excited to where they can again participate in the stimulated emission laser process, is long. Consequently, the gas-cooling rate will be lower for diffusion cooled lasers that utilize large diameter discharges than for $CO_2$ diffusion cooled laser whose discharges have smaller cross section. This results in lower power per laser beam cross sectional area as the cross sectional area of the discharge $CO_2$ diffusion cooled laser is increased. The power output for diffusion cooled circular discharges scales as the inverse of the discharge tube diameter. As a result, the output power of diffusion cooled lasers with circular or square discharges can, to first order, only be increased by increasing the length of the discharge (Compact Distributed Inductance RF Excited Waveguide Gas Lasers by Leon A. Newman, John T. Kennedy, Richard A. Hart, U.S. Pat. No. 4,787,090, Nov. 22, 1988; Extended Multiple Folded Optical Path Laser, by Armando Cantoni, U.S. Pat. No. 5,610,936 issued Mar. 11, 1997, which are incorporated herein by reference).

Increasing the discharge length of diffusion cooled lasers beyond a convenient and practical length is usually accomplished by folding the discharge into some form of a closely packed zigzag pattern to obtain small, compact, rugged, and rigid laser head packages (Recent Research and Development Advances in Sealed-Off $CO_2$ Lasers, by Leon A. Newman and Richard A. Hart, Laser Focus/Electro-Optics, June 1987, which is incorporated herein by reference). Utilizing the concept of U.S. Pat. No. 5,610,936, Armando Cantoni extended this concept of multiple folded optical path square waveguide shaped laser configuration to an unfolded single mode waveguide length of approximately six meters. With this six meter length, approximately 200 watts of output power was obtained with approximately thirtyfive optical bounces off multiple folding mirrors. Unfortunately, the impedance difference seen by the solid state RF source driving the large area discharge before the discharge is ignited compared to after it is ignited is so large that lighting the discharge and maintaining the discharge with one phase matching network structure is difficult. Distributed induction for tuning out the capacitance is used in Tuned Circuit RF Excited Laser, by Peter P. Chenausky, Errol H. Drinkwater, Lanny M. Laughman, U.S. Pat. No. 4,363,126 issued Dec. 7, 1982, which is incorporated herein by reference. U.S. Pat. No. 4,787,090 utilized spiral distributed inductors to achieve the tuning out of the capacitance taught by U.S. Pat. No. 4,363,126.

The output power of diffusion cooled lasers can also be increased by utilizing a rectangular discharge containing section. The two closely spaced walls of the rectangular discharge configuration provides good diffusion cooling while the other two walls of the rectangular discharge housing that are located far apart providing an increase in gas volume. This increase is gas volume yields higher output powers for a given length of laser. These rectangular discharge lasers are called slab lasers (Power Scaling of Large Area Transverse RF Discharge $CO_2$ Lasers, by K. M. Abranski, A. D. Colley, etc., Applied Physics Letters, Volume 54 page 1833, 1989, which is incorporated herein by reference). $CO_2$ slab laser technology has been responsible for pushing the average power output of diffusion cooled lasers to approximately the 1000 W range. Slab lasers normally yield multimode, large divergent beams unless the use of more complex optical feed back resonators, such as unstable resonators, are utilized to discriminate against the higher order modes.

Referring now to prior art FIGS. 1A–1D, the general types of RF excited diffusion cooled laser discharge configurations known today and normally found in presently commercially available $CO_2$ laser heads with the exception of FIG. 1D are illustrated.

FIG. 1A illustrates the cylindrical discharge configuration, which usually utilizes either a glass or ceramic tube 2a. This configuration was the first to be utilized in diffusion cooled lasers dating back to 1972 for RF excited discharges and dating back to the mid 1960's for DC excited discharges. In general, RF excitation has advantages over DC excitation predominantly because (i) the electrodes 4a, 6a are external to the discharge region 10, (ii) low voltages are utilized, and (iii) RF excitation is more compatible with solid state electronics. For the RF excited discharge arrangements, electrodes 4a, 6a are placed opposite one another down the outside length of the tube 2a across which an RF voltage is applied to excite the discharge. Larger diameters result in multiple modes unless more complex optical resonators are used, while smaller diameters (about several millimeters or less) result in waveguideing action that yield single mode beams with simple optical resonators configuration. $CO_2$ diffusion cooled laser operation in a BeO capillary was reported in 1972 (BeO Capillary $CO_2$ lasers by E. G. Burkhardt, T. J. Bridges, and P. W. Smith, Optical Communication, Volume 6 pages 193–1951, October 1972, which is incorporated herein by reference). Larger diameter tubes result in lower output power per unit discharge cross-sectional area because of the $1/D^2$ power output scaling characteristics mentioned previously. D is the tube diameter. For waveguide lasers, flat mirrors in closed proximity to the ends of the waveguide are normally used which greatly simplify the optical resonator.

The ground electrode 4a, 4b, 4c, 4d is normally part of the metal vacuum tight housing for all the configurations shown in FIGS. 1A–1D. This housing arrangement provides for good electromagnetic interference shielding and for good thermal conduction for either air or liquid cooling of the housing 8a, 8b, 8c, 8d.

FIG. 1B illustrates the square discharge configuration 10b where the height (H) and width (W) are equal. This is the second oldest diffusion cooled waveguide $CO_2$ laser technology. It dates back to the late 1970's. This technology was utilized mainly for military laser radar and infrared (IR) counter measures applications in the past. This is the first configuration where waveguide folding was used to increase the length of the discharge to scale up the power for a given laser head length (Recent R & D Advances in Sealed Off $CO_2$ Lasers by Leon A. Newman and Richard A. Hart, Laser Focus/Electro-Optics; June, 1987, which is incorporated herein by reference). In the mid 1990's this technology began to be available for industrial applications. The same general comments regarding diffusion cooling and dimension scaling that were made for FIG. 1A apply to FIG. 1B. The insulator 12b separating the hot electrode 6b and the ground electrode 4b which is part of the laser housing 8b) is normally a low cost ceramic, which serves both as a good electrical insulator and a thermal conductor with excellent vacuum compatibility. Either air or liquid cooling can be used to conduct heat away at the location of the ground electrode 4b. Additional cooling can be obtained from the sides of the laser discharge housing 8b if required because of the good thermal conductivity of the ceramic and the metal housing 8b. Note that all of these basic discharge configurations provide space for a gas ballast 14b region for the $CO_2$:$N_2$:He gas mixture. This gas ballast contributes to the long sealed off lifetime of diffusion cooled lasers. Gas pressure in all the illustrated configurations of FIGS. 1A–1D normally range from several tens of torr to several hundreds of torr depending on the RF drive frequency and operating characteristics desired. Higher RF frequencies enable operation at high pressures which result in higher output power for a given discharge volume at the expense of higher cost associated with the power transistors.

U.S. Pat. Nos. 4,787,090 and 5,610,936 and patent application Ser. No. PCT/US98/05055, RF Excited Waveguide Laser, by R. A. Hart, J. T. Kennedy, E. H. Mueller and & L. A. Newman; filed on Mar. 13, 1998 based on U.S. Provisional Patent Application No. 60/041,092 filed on Mar. 14, 1997, which are incorporated herein by reference, discuss several approaches to waveguide folding to obtain a long discharge laser gain region for scaling to higher power for diffusion cooled waveguide gas lasers. If the electrodes 4b, 4c, 4d, 6b, 6c, 6d of FIGS. 1B through 1D are separated from the discharge region such as by the dielectric tube 2 in FIG. 1A, the output of the laser is not polarized. If one or both of the metal electrodes 4b, 4c, 4d, 6b, 6c, 6d are directly exposed to the laser radiation in the waveguide as in FIG. 1B through 1D then the output laser radiation is polarized parallel to the surfaces of the electrode(s).

Referring to prior art FIGS. 2A and 2B, two folded waveguide versions 16a, 16b for use in the configuration of FIG. 1B, utilized in commercially available waveguide lasers at the present time as discussed in U.S. Pat. No. 4,787,090 and patent application Ser. No. PCT/US98/05055 are generally shown. U.S. Pat. No. 5,610,936 describes a more elaborate folding arrangement and describes a rectangular ceramic folded diffusion cooled $CO_2$ waveguide structure that contains two triangular end sections in which a grid waveguide structure consisting of two sets of parallel waveguide channels intersecting at right angles and optically coupled by the strip mirrors placed along edges of the triangular end sections. This approach has yielded approximately 200 W of output power. The "N" folded waveguide 18 of prior art FIG. 2A has yielded approximately 75 watts of output power in a laser head having dimensions of approximately 24 inches (L)×3 inches (W)×2.6 inches (H) and a total unfolded waveguide length of approximately 1.4 meters. The folded waveguide 20 of prior art FIG. 2B is folded in the shape of an "NV." It typically yields 145 W of output power in a laser head having dimensions of approximately 24 inches (L)×4 inches (W)×3 inches (H) and a total unfolded waveguide length of approximately 2.25 meters. Comparing these results reveals that the waveguide configurations of FIGS. 2A and 2B are preferred over the configuration disclosed in U.S. Pat. No. 5,610,936.

There is one disadvantage in having a $CO_2$ laser cavity that is too short. This has to do with the narrow line width of the $CO_2$ molecules at the pressures of interest for use in $CO_2$ lasers. The $CO_2$ laser line broadens with pressure at approximately 5 MHz per torr. At 100 torr, the $CO_2$ homogeneously broadened laser line is only approximately 500 MHz wide. Consequently, the length of the $CO_2$ laser feedback cavity has a large effect on the output power stability as a function of temperature. This occurs because the optical frequency separation between adjacent axial modes of the lasers optical cavity is given by the velocity of light divided by twice the length of the cavity. Consequently for a cavity length of 20 cm, the optical frequency separation of the axial modes is 750 MHz while for a 100 cm long cavity, the axial modes are separated by 150 MHz. Consequently, the 100 cm long cavity laser has approximately five times more axial density when compared with the 20 cm long laser cavity. As the temperature of the laser varies with time, the frequency of these axial modes move through the laser gain bandwidth region. As one axial mode moves past the peak of the laser gain curve, output power begins to decrease. The output power will continue to decrease until the next adjacent axial modes have achieved higher gain and it begins to oscillate. This oscillation turn on of one axial mode and the oscillation turn off of a previously oscillating axial mode as they move across the peak of the gain curve causes the output power to vary as the temperature of the laser (i.e. the optical resonator) varies with time. The actual output power variation is depended on the gas pressure, on how hard the laser is excited, etc. Consequently, a long waveguide laser gain configuration maintains superior output power stability over a short gain length configuration because the large density of axial modes existing in a longer laser feedback cavity.

FIG. 1C illustrates the basic configuration of a slab laser discharge 10c. This technology was first introduced around the mid 1980's and commercially around 1990. (Carbon Dioxide Slab Laser, by John Tulip, U.S. Pat. No. 4,719,639 issued January 1988, which is incorporated herein by reference). The larger width of the discharge region 10c provides a larger cross sectional area for the gain region and thus a larger volume for a given laser length which enables the design to yield higher output power per unit length of discharge than the configurations of FIG. 1A or 1B. As stated above, excellent waveguiding and diffusion cooling occurs in the vertical direction because of the narrow height (H) of the slab discharge region. Since single mode optical waveguiding does not occur in the horizontal direction of slab lasers because of the large width Fresnel number, $N_{fw}$, more complex optical resonators, such as unstable resonators, are utilized to discriminate against multimode oscillation occurring in the horizontal direction. The slab technology has enabled diffusion-cooled lasers to successfully compete with convectively cooled laser in excess of 500 W. Most slab lasers are operated pulsed rather than operated continuously in order to maintain uniform discharges across the wide area of the slab. In most cases separate gas ignition circuits are provided to ensure the discharge can be easily ignited when the discharge area of diffusion cooled lasers is large, such as for slab lasers.

FIG. 1D illustrates the basic feature of the inverted slab discharge laser configuration 10d. This is the newest diffusion cooled laser configuration and, as yet, is not commercially available nor has performance data been published (Rectangular Discharge Gas Laser, by Peter Chenausky, U.S. Pat. No. 5,748,663 issued May 5, 1999, which is incorporated herein by reference). The advantages for this configuration over the normal slab laser configuration are: 1) the ability to independently select and optimize the laser's discharge pressure and excitation frequency, 2) having a higher discharge impedance in a lower capacitance structure for a better interfacing with solid state RF supplies, and 3) having an improved ability to supress arching within the discharge.

It is well accepted in the market place that diffusion cooled, slab $CO_2$ lasers have size, cost, maintenance, and performance advantages over the convectively cooled $CO_2$ laser up into the neighborhood of 500 W to 1000 W of output power. Approaching 1000 W and higher output powers, the convectively cooled $CO_2$ lasers have the cost/performance advantages at this time. Additional attractions of diffusion cooled lasers are longer sealed-off operational and storage life times because of the ability to use superior vacuum tight technology and internal electrodes are not needed to excite the discharge, lower voltage requirements which are compatible with solid state RF power supply technology, higher reliability, lower maintainability cost because of no mechanical moving parts, and lower operational cost because there is no gas consumption with time. A sealed-off operation of over 20,000 hours without needing a gas refill is common place today. Waveguide diffusion cooled lasers have typically been limited to 150 to 200 W levels, well below the power capability of slab lasers.

The waveguide aperture dimensions used in waveguide gas lasers are much greater than the radiation wavelength emitted by the laser. Typical gas laser waveguides have intermediate aperture values equal to or greater than 100 times the wavelength of the radiation contained in the waveguides. (Chapter 3 entitled Radio Frequency Discharge Excited $CO_2$ Lasers, by Denis R. Hall and Christopher A. Hill of the Handbook of Molecular Lasers, Edited by Peter K. Cheo, Marcel Dekker, Inc., 1987, which is incorporated herein by reference). Gas laser waveguides are of the special guides proposed in 1964 by E. A. J. Marcatili and R. A. Schmeltzer in Bell System Technical Journal, Vol. 43, page 1788, 1964, which is incorporated herein by reference. Such was directed toward long distance communication applications prior to the introduction of low loss glass fiber technology.

Some typical $CO_2$ laser waveguide materials are alumna ($Al_2O_3$), aluminum (Al), Pyrex, oxide glass compounds, and beryllium (BeO). These materials are strongly absorbent at the IR wavelengths emitted by $CO_2$ lasers (i.e. 9 $\mu$m to 11 $\mu$m). Aluminum is absorbent in the IR region of 9 $\mu$m to 11 $\mu$m because of the native oxide that always resides on its surface. Because of this absorption, only modes that have very small angle of reflection (i.e. glazing angles) off the absorbing walls of the guides have low loss. As a result, gas laser waveguides support no more than a few tens of practically relevant modes, each associated with small angle reflections at the guide wall. Consequently waveguides for gas lasers are very different than the glass waveguides utilized in fiber lasers.

In contrast to the focus of Marcatili and Schmeltzer (referenced above) on long distance optical propagation for telecommunications/data transmission, gas laser waveguide lengths are short and bending of the waveguides are not required nor desired. U.S. Pat. Nos. 4,787,090 and 5,610,936 and patent application Ser. No. PCT/US98/05055 revealed that folding of these waveguides present low loss that is very acceptable, especially with U.S. Pat. No. 4,787,090 and patent application Ser. No. PCT/US98/05055. Consequently, increasing the waveguide length has been a practical avenue for obtaining increased power output from waveguide lasers. Prior to U.S. Pat. Nos. 4,787,090 and 5,610,936 and patent application Ser. No. PCT/US98/05055, the length of gas laser waveguides were in the tens of centimeters. The longest present commercially available sealed waveguide $CO_2$ laser utilizing the "NV" folded waveguide of FIG. 2B and patent application Ser. No. PCT/US98/05055 has a waveguide length of approximately 2.25 meters (see FIG. 2B) and has an output power exceeding 250 W. In experimental lasers using the Cantoni patent (U.S. Pat. No. 5,610,936), path lengths up to six meters have been demonstrated but only 200 W were obtained. This result indicates that the advantage of the tightly folded zigzag waveguide configuration associated with FIGS. 2A and 2B.

Until now, waveguide gas lasers having circular or square waveguide apertures, with either straight of folded configurations have been utilized. Slab lasers, which do not use waveguideing in the wide dimensions, are also known. Patent application Ser. No. PCT/US98/05055 was the first disclosure to indicate the advantage of $CO_2$ laser waveguides having a rectangular configuration that still retained a simple optical resonator with all flat mirrors while also maintaining good mode quality (i.e. little or no side lobes adjacent to the main central lobe of the output beam). Patent application Ser. No. PCT/US98/05055 discloses a rectangular waveguide with a width to height aspect ration of 2 to 1 with the longer width waveguide dimension of the rectangular guide lying parallel to the width of the two opposite facing electrodes. The focus of patent application Ser. No. PCT/US98/05055 was on increasing the width of the guide so as to achieve an aspect waveguide ratio of width to height of approximately 2 to 1. Patent application Ser. No. PCT/US98/05055 also disclosed techniques for converting the elliptical output beam from the laser possessing such a rectangular guide into a circular beam having the desired diameter.

SUMMARY OF THE INVENTION

The above discussed shortcomings and other drawbacks and deficiencies of the prior art are overcome or alleviated by a laser of the present invention. In accordance with the present invention the laser comprises a housing defining a plurality of compartments therein, a waveguide disposed within the housing, the waveguide defining a plurality of rectangular waveguide channels having a substantially rectangular cross section for guiding a laser beam, a plurality of electrodes disposed in the plurality of compartments and positioned along opposite surfaces of the waveguide and at least one power supply connected to the plurality of electrodes. The channels having a prescribed width to height ratio for a prescribed total channel length for a given Fresnel number. At least one optical housing is provided. The optical housing is mounted to the laser housing, the optical housing including a plurality of beam turning mechanisms disposed within a plurality of compartments accessible for adjusting the beam turning mechanisms. The channels are disposed within the waveguide so as to subtend a prescribed angular orientation between adjacent channels. Distributed inductors are provided for suppressing the capacitance of the electrodes.

BRIEF DESCRIPTION OF THE DRAWINGS

FIG. 1A illustrates a cylindrical discharge configuration for a prior art RF excited diffusion cooled laser;

FIG. 1B illustrates a square discharge configuration for a prior art RF excited diffusion cooled laser;

FIG. 1C illustrates a slab discharge configuration for a prior art RF excited diffusion cooled laser;

FIG. 1D illustrates an inverted slab discharge configuration for a prior art RF excited diffusion cooled laser;

FIG. 2A illustrates a prior art "N" configuration of a folded waveguide laser with angles less than 10 degrees between adjacent waveguide channels;

FIG. 2B illustrates a prior art "NV" configuration of a folded waveguide laser with angles less than 10 degrees between adjacent waveguide channels;

FIG. 3 is a graphical depiction of data obtained of the relative mode quality of a $CO_2$ waveguide laser as a function of Fresnel number, $N_{f_w}$, in the width dimension while having a constant waveguide height of about 0.11 inches;

FIG. 10B is a top view of the folded waveguide structure for the "N3V" configuration of FIG. 10A;

FIG. 12 is a three dimensional view of the mirror housing of FIGS. 11A and 11B including the reflecting mirror optical component mount of FIGS. 11C–11E and the transmission mirror optical component mount of FIG. 21;

FIG. 15A is a schematic representation of a split RF electrode discharge arrangement for a diffusion cooled waveguide laser with separate power supplies;

FIG. 15B is a schematic representation of a split RF electrode discharge for a diffusion cooled waveguide laser with common oscillator and preamplifier (if required) driving separate RF power devices;

FIG. 16B is a top view of a split RF electrode discharge for a diffusion cooled waveguide laser for an "NV" waveguide configuration shown as an example;

FIG. 18B is a top view of the housing of the diffusion cooled waveguide laser of FIG. 18A;

FIG. 18C is side view of the housing of the diffusion cooled waveguide laser of FIG. 18A;

FIG. 19A is a top sectional view of the interior of the housing of the diffusion cooled waveguide laser of FIGS. 18A–18C;

FIG. 19B is an end view of the housing of the diffusion cooled waveguide laser of FIGS. 19A and 18A–18C;

DETAILED DESCRIPTION OF THE INVENTION

It has not been previously appreciated that in a waveguide laser the width of the waveguide channel can be approximately scaled with the channel length, $L_c$, for a given width Fresnel number, $N_{fw}$, of the waveguide while keeping the height of the waveguide constant at a value that simultaneously provides good diffusion cooling and good mode quality in the vertical direction (i.e. the vertical direction being perpendicular to the surfaces of the two parallel electrodes). One example of a range of height dimensions that satisfy good diffusion cooling and good mode quality is a range of from about 0.08 in. to about 0.15 in.

Figure 22:
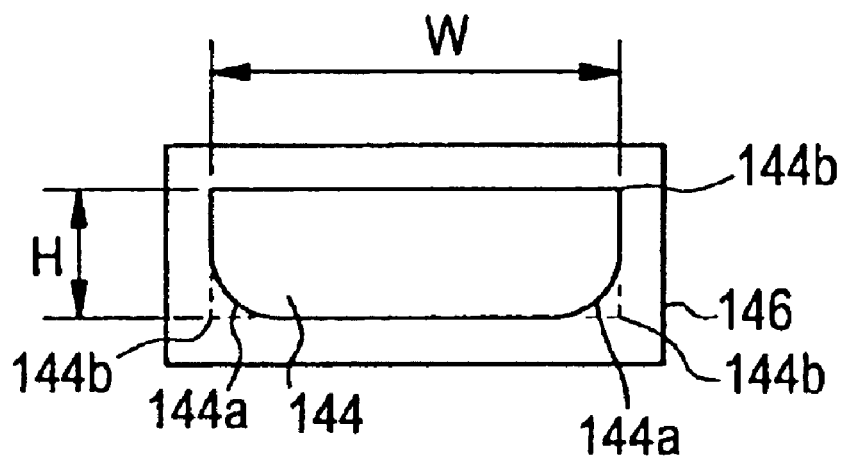
FIG. 22 is a cross sectional view of a channel in a segment of the waveguide structure whose width to height ratio is greater than 2 to 1.
Figure 23:
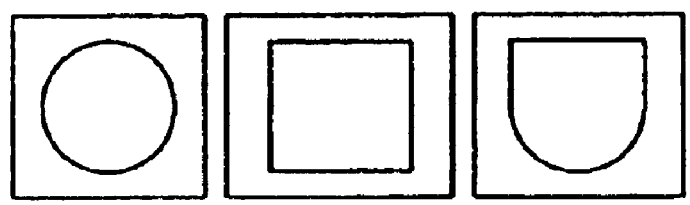
FIG. 23 is a cross sectional view of prior art channels in waveguide structures.

By increasing the length of the channel while keeping the height and the Fresnel number in the width direction, $N_{fw}$, constant, a new width of the rectangular channel can be calculated that should yield a comparable mode quality as that of the shorter channel having the narrower rectangular channel width. In this manner, the rectangular channel width to height aspect ratio can increase with increasing length of the channel. FIG. 23 is a view of prior art cross sections of waveguide channels. FIG. 22 is a generalized view of the cross section of the waveguide channels 144 of the present invention. The waveguide channels 144 are substantially rectangular in shape and may include rounded corners 144a or square corners 144b. The aforementioned width scaling is advantageous because it enables the volume of the gas discharges region to increase faster than linearly with the total waveguide channel length $L_c$. The gas volume then scales as $L_c^{3/2}$ instead of as $L_c$ for a given Fresnel number, namely $$N_{fw} = W^2/4\lambda L_c \tag{1}$$

and $$\text{Volume} = HWL_c = H(N_{fw}4\lambda)^{1/2}L_c^{3/2} \tag{2}$$
$$= CN_{fw}^{1/2}L_c^{3/2},$$

where $$C = H(4\lambda)^{1/2} \tag{3}$$

is a constant for a given height, H, and wavelength, $\lambda$. The increased gas volume for a selected mode quality provides a capability for higher power output waveguide gas lasers for a given package size while utilizing simple and inexpensive flat mirrors in close proximity to the folding angles of the zigzag folded waveguide. A waveguide laser configuration of FIG. 2B has yielded up to 170 Watts of output power with no sidelobes utilizing the technique of this invention with an unfolded waveguide length of 225 cm and with 1125 W of RF power input. The waveguide depicted in FIG. 2B was inserted into a hermetically sealed housing of FIG. 8 of patent application Ser. No. PCT/US98/05055 having dimensions of 24 inches in length (L) by 4 inches wide (W) and 3 inches in height (H).

Considering an observation point situated on the z axis at a distance L out from the center of a rectangular aperture of width "W" and height "H", the number of Fresnel zones contained within the aperture, as seen from the observation point, is given by the Fresnel number defined by:

$$N_{fw} = \frac{W^2}{4L\lambda} \tag{4}$$

for the width dimension and $$N_{fH} = \frac{H^2}{4L\lambda} \tag{5}$$

for the height dimension, where $\lambda$ is the wavelength of the laser output beam.

The importance of this Fresnel number parameter for free space beam propagation and for free space optical resonators has been well known (Lasers by Anthony E. Siegman, University Science Books, pages 712 to 727, 1986, which is incorporated herein by reference). The importance of the Fresnel number to the aperture scaling of waveguides for gas lasers has not heretofore been appreciated. Because of this shortcoming, square shaped waveguides have been predomanantly used for gas lasers with the exception of the disclosure contained in patent application Ser. No. PCT/US98/05055, which was limited to a 2 to 1 width to height aspect ratio. Consequently, the full output power capability of waveguide lasers of given external dimensions was not realized in the past. This invention overcomes this limitation and enables sealed off waveguide gas lasers to achieve their optimum output power performance and to move up into the lower output power ranges presently addressed by slab laser technology (i.e., 200 W to 500 W).

This invention addresses techniques for increasing the width of the waveguide with increasing length of the gain region of waveguide lasers while maintaining good mode quality with a simple optical resonator configuration. The disclosed approach increases the output power of the waveguide laser without having to utilize more complex resonators, such as unstable resonators or resonators with curved mirrors. It will be appreciated though that the aforesaid more complex resonator laser configurations can benefit from the teaching of this invention. The disclosed invention pushes the output power of sealed-off diffusion cooled waveguide lasers into the region presently dominated by slab lasers. This invention teaches that a rectangular waveguide width-to-height aspect ratio can increase while increasing the length of the guide, thereby enabling the volume of the gas discharge to increase faster than linearly with the waveguide length. The techniques addressed by this invention can allow waveguide lasers to compete with slab lasers in the 100 W to 500 W ranges by increasing the width-to-height aspect ratio of a gas laser waveguide as the total channel length, $L_c$, is increased. This is important because it enables the discharge volume to increase faster than linearly with the waveguide length for a given Fresnel number as given by $$\text{Vol} = (4\lambda N_{fw})^{1/2} H (L_c)^{3/2}, \tag{6}$$

where H is the waveguide height, $N_{fw}$ is the width Fresnel number, $L_c$ is the total length of the waveguide channels and $\lambda$ is the wavelength Referring to FIG. 3, a graphical representation 102 of data taken of relative mode quality of a laser beam as a function of an increasing Fresnel number, $N_{fw}$, ranging from about 0.1 to about 0.6 in rectangular waveguide channels whose height was fixed at approximately 0.28 cm and whose width, W, and total length, $L_c$, was varied, is generally shown. FIG. 3 is the first time that such waveguide laser mode quality versus Fresnel number data has been taken. The maximum value of $N_{fH}$ for this data was about 0.13. The data of FIG. 3 is grouped in clusters 102a with some degree of variation within each cluster 102a. However, in general, the data show a substantially linear relationship between mode quality and width Fresnel number, $N_{fw}$, with a negative going slope. For most of the data $N_{fH}$ was less than 0.13 in order to obtain a small enough height so that good diffusion gas cooling is obtained in addition to good mode quality in the height axis. The waveguide channel width, W, was varied from about 0.225 cm to 0.686 cm and the total waveguide channel length, $L_c$, from about 42 cm up to 226.1 cm while maintaining the height, H, constant at approximately 0.28 cm. From Eqns. 1 and 2 hereinabove it is appreciated that for a given width Fresnel number, $N_{fw}$, and wavelength, $\lambda$, one can scale up the width of a rectangular waveguide by the square root of the total channel length, $L_c$, of the waveguide and still maintain a desired mode quality. For a given $N_{fw}$, one can scale the discharge volume and therefore the output power by $L_c^{3/2}$ instead of by $L_c$ and still maintain the same mode quality, while if the waveguide width was held constant, the gas volume and thus the output power would scale linearly with $L_c$.

Figure 4A:
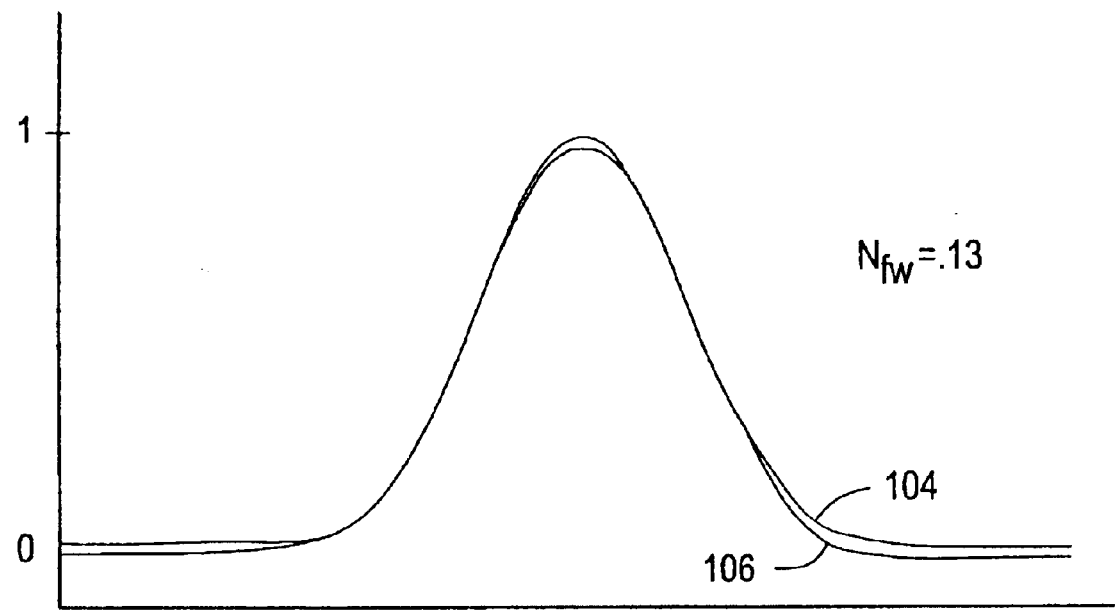
FIG. 4A illustrates the width beam profile of the output of an "N" configuration 50 W $CO_2$ waveguide laser measured at 60 cm from the output of a square waveguide for a width Fresnel number equal to 0.13 as compared to a Gaussian profile.
Figure 4B:
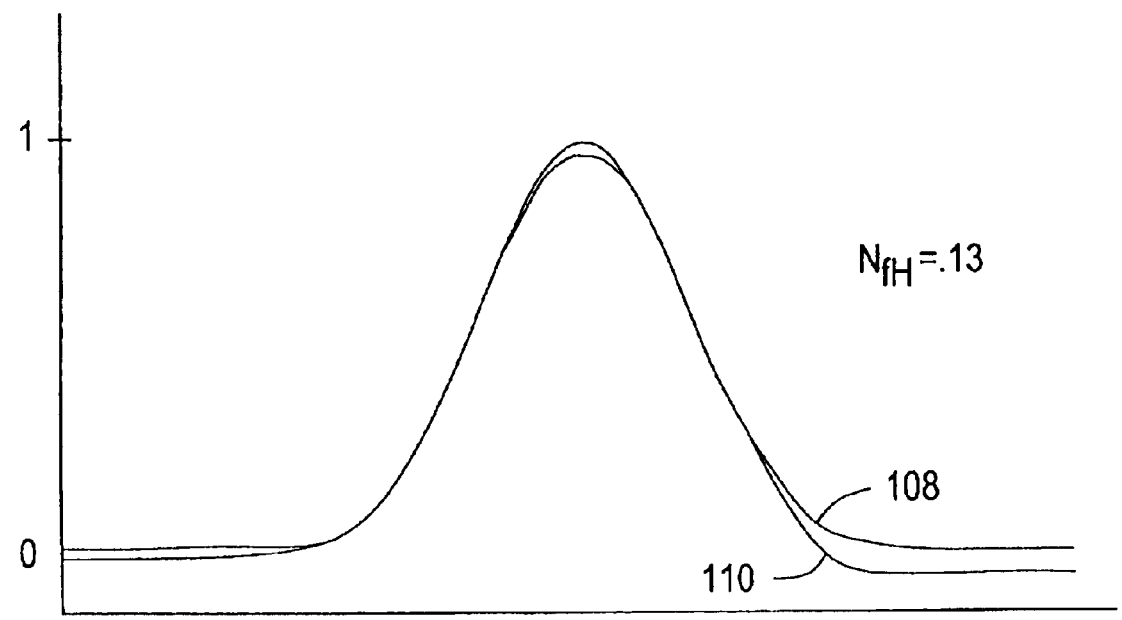
FIG. 4B illustrates the height beam profile of the output of a $CO_2$ "N" configuration 50 W waveguide laser of FIG. 4A measured at 60 cm from the output of a square waveguide for a height Fresnel number equal to 0.13 as compared to a Gaussian profile.

Referring to FIG. 4A, the laser beam profile 106 in the width direction measured 60 cm from the output of a square waveguide $CO_2$ laser is shown. The Fresnel number for the height and width dimensions of the waveguide channel was 0.13. Referring to FIG. 4B, the laser beam profile 110 in the height direction measured 60 cm from the output of a square waveguide channel $CO_2$ laser is shown. As can be seen from FIGS. 4A and 4B, there is a very close fit between a Gaussian profile 104, 108 and the output beam profiles 106, 110. The data was taken with a photon beam scanner, as were all the other beam profile data to be presented herein.

As expected, the vertical and horizontal profiles are almost identical for this situation.

Figure 5A:
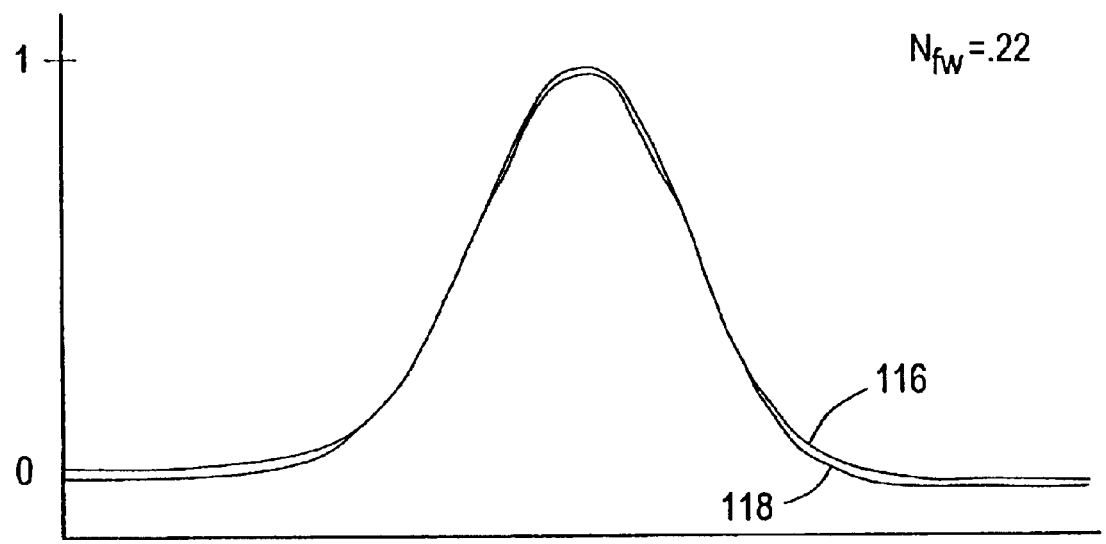
FIG. 5A illustrates the width beam profile of the output a of $CO_2$ "NV" configuration 100 W waveguide laser measured at 60 cm from the output of a rectangular waveguide for width Fresnel number equal to 0.22 as compared to a Gaussian profile.
Figure 5B:
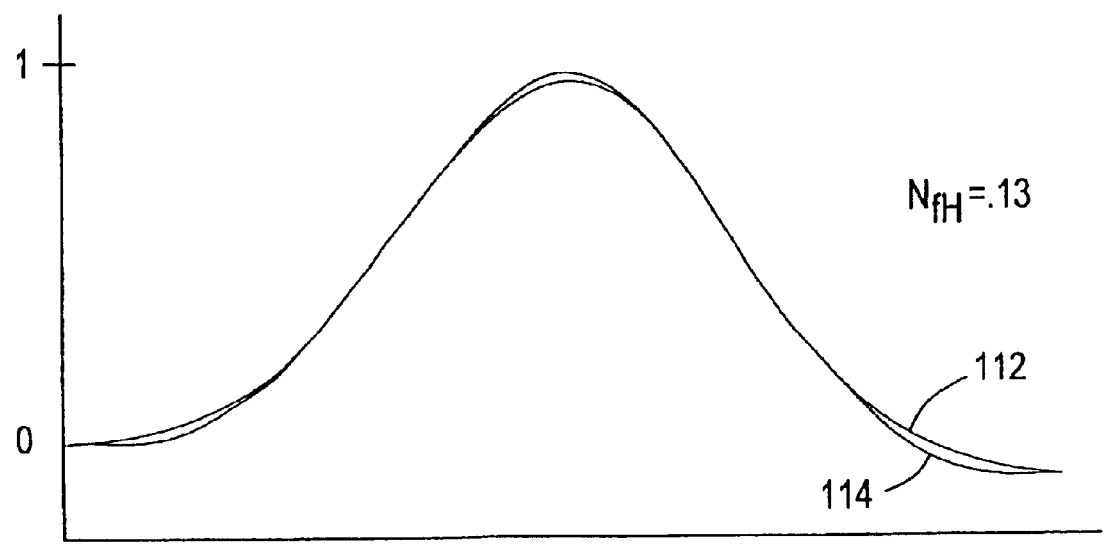
FIG. 5B illustrates the height beam profile of the output of a $CO_2$ "NV" configuration 100 W waveguide laser measured at 60 cm from the output of a rectangular waveguide for a height Fresnel number equal to 0.13 as compared to a Gaussian profile.

Referring to FIGS. 5A and 5B, the laser beam profile in the width and height direction respectively, again measured 60 cm from the output of a rectangular waveguide channel laser, is shown. The width of the waveguide channel aperture was about 0.45 cm and $N_{fw}$=0.22. As can be seen from FIG. 5B, the profile 114 of the output laser beam corresponding to the height of the rectangular waveguide channel aperture (i.e., 0.28 cm) is considerably wider, as expected, than the laser beam profile 118 corresponding to the width of the waveguide channel aperture as seen in FIG. 5A. As can be seen, each profile is a very close fit to a Gaussian profile 112, 116.

Figure 6:
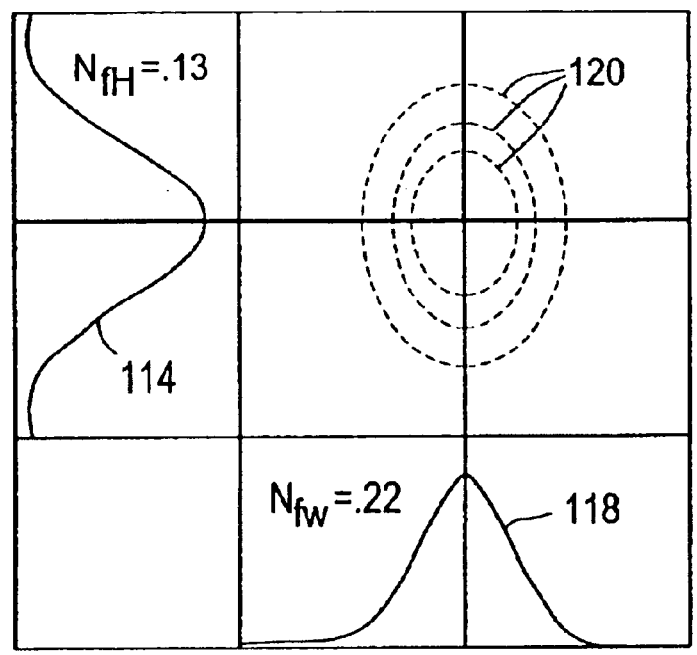
FIG. 6 illustrates the elliptical contours of the uncorrected output beam of FIG. 5A and FIG. 5B.
Figure 7:
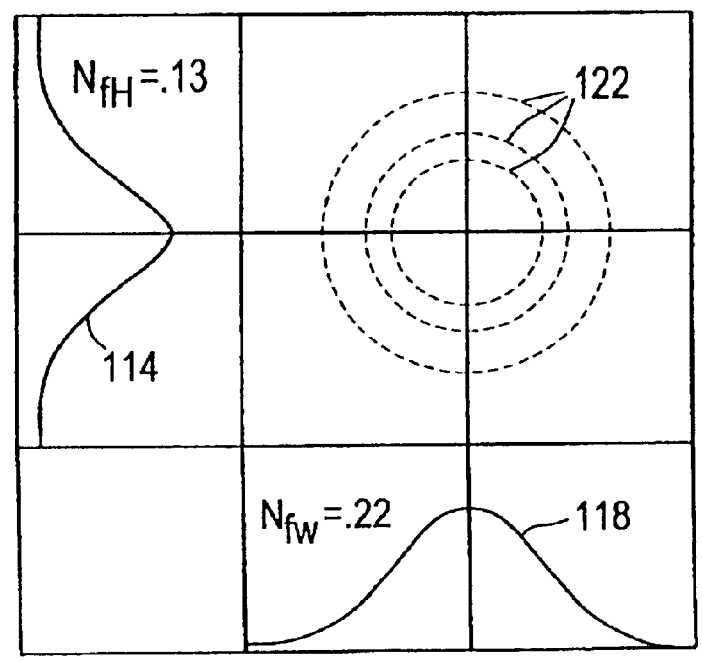
FIG. 7 illustrates the circular contours of the corrected output beam of FIG. 6.

Referring to FIG. 6, the elliptical contours 120 of the emitted laser beam from the $CO_2$ laser associated with FIGS. 5A and 5B are shown. Applying the beam correction techniques disclosed in patent application Ser. No. PCT/US98/05055, the output profile shown in FIG. 7 is obtained. As can be seen, a circular beam contour 122 is obtained for this case as expected.

Figure 8A:
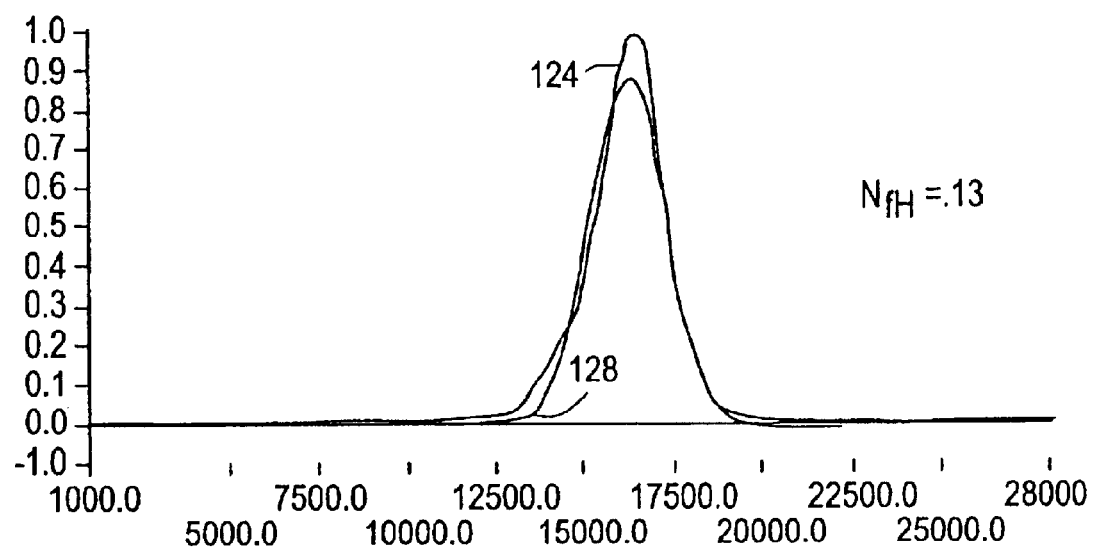
FIG. 8A illustrates the actual height beam profile emitted by a rectangular "N" configuration waveguide $CO_2$ laser for a height Fresnel number equal to 0.13 and a Gaussian beam profile fit after beam correction.
Figure 8B:
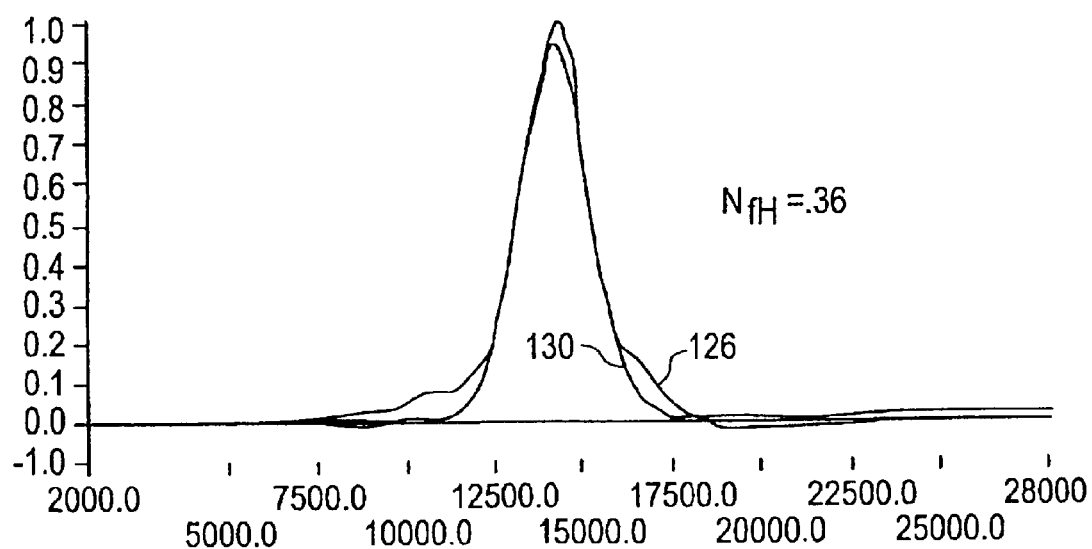
FIG. 8B illustrates the actual width beam profile emitted by a rectangular "N" configuration waveguide $CO_2$ laser for a width Fresnel number equal to 0.36 and a Gaussian beam profile fit after beam correction.

Referring to FIGS. 8A and 8B, an actual laser output beam profile 124, 126 emitted by a rectangular waveguide channel $CO_2$ laser having a $N_{fw}$=0.36 and a $N_{fH}$=0.13 is shown after having beam correction performed on it with the technique disclosed in patent application Ser. No. PCT/US98/05055. Also shown is a Gaussian beam profile fit 128, 130 for these beams. This data was also measured 60 cm from the laser aperture. The data reveals that after beam correction, the output beam profiles 124, 126 are not ideal and there is evidence of off axis modes or side lobes being present which distort the beam profile away from a Gaussian beam fit. This is an indication that the width of the channel is too wide for the 136 cm length of the unfolded waveguide. For most laser applications, such beam side lobes make this laser output beam unattractive.

Figure 9A:
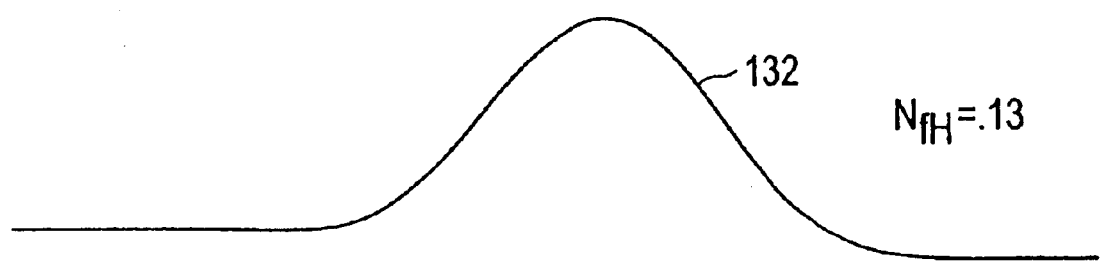
FIG. 9A illustrates the height output beam profile of a rectangular "NV" configuration waveguide laser having a height Fresnel number equal to 0.13.
Figure 9B:
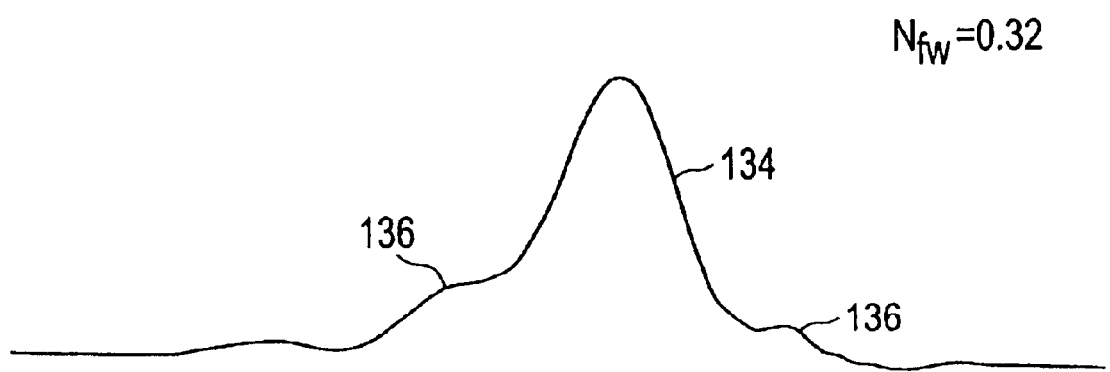
FIG. 9B illustrates the width output beam profile of a rectangular "NV" waveguide laser having a width Fresnel number equal to 0.32.

Referring to FIG. 9A, an uncorrected laser beam profile 132 is shown in the height direction of a rectangular channel waveguide laser having $N_{fH}$=0.13. Referring to FIG. 9B, an uncorrected laser beam profile 134 is shown in the width direction of the same rectangular waveguide laser having a width of 0.56 cm and an unfolded total waveguide length of 226 cm. Note the Gaussian-like shape of the beam in the height direction and the side lobes 136 existing on the beam in the horizontal directions. Again this indicates that the width of this channel, W, is too wide for the channel length, $L_c$. The profile of a corrected optical beam for $N_{fw}$=0.32 (not shown) is slightly superior to the corrected optical beam for $N_{fw}$=0.36 of FIG. 8.

From FIG. 3, it will be appreciated that a Fresnel number of less than about 0.25 provides acceptable to very acceptable laser mode quality for most applications that utilize sealed-off diffused cooled $CO_2$ lasers, such as for marking, engraving, cutting, drilling, or trimming of materials or for medical applications, etc. As higher mode quality is needed, one moves the waveguide design to lower Fresnel numbers.

Figure 10A:
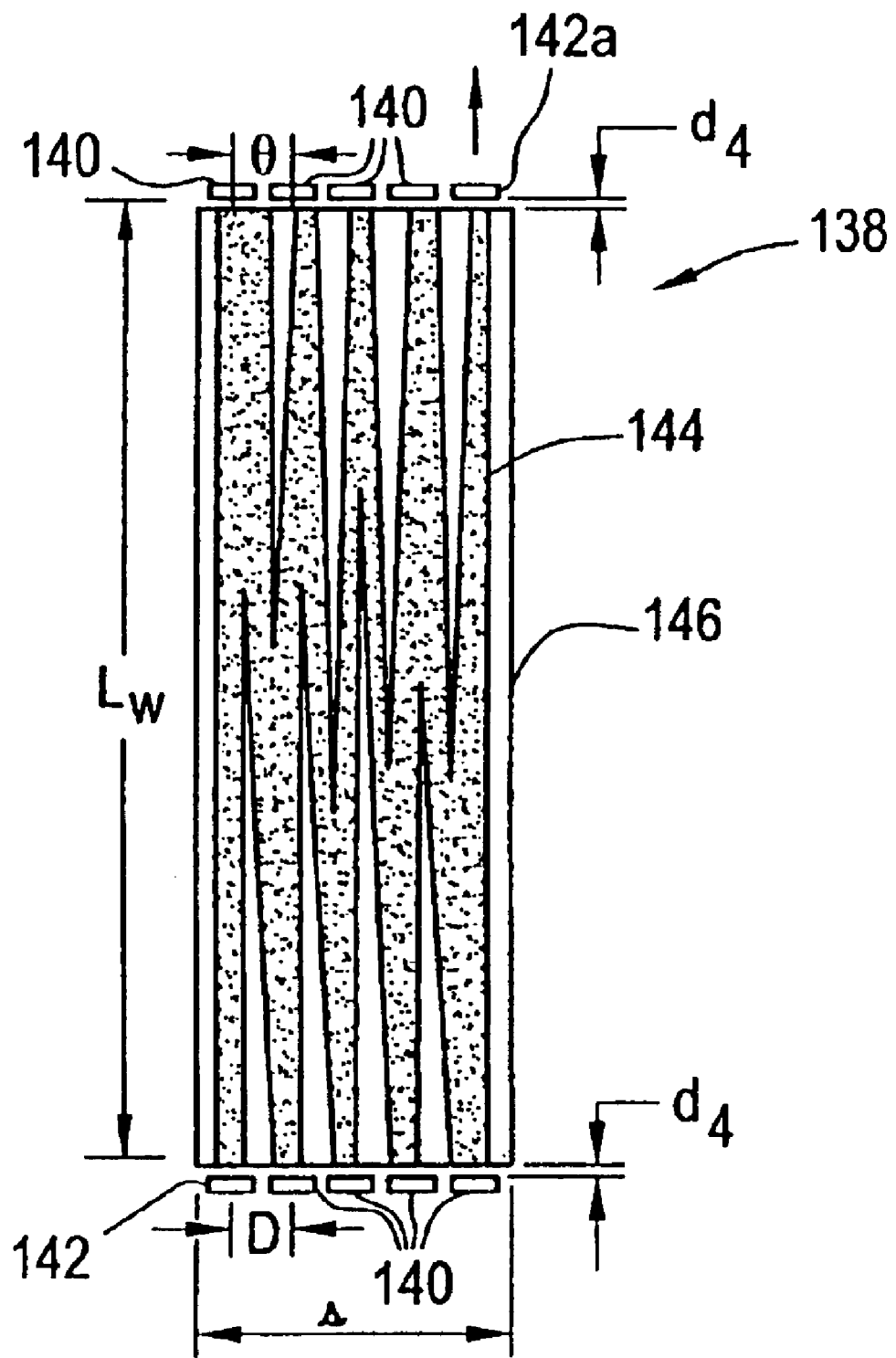
FIG. 10A illustrates an "N3V" configuration of a folded waveguide laser including a plurality of folding mirrors and a plurality of feedback mirrors.

Referring to FIG. 10A, a generalized schematic representation of an "N3V" or "NVVV" folded waveguide configuration 138 having a plurality of beam redirection mechanisms including eight folding mirrors 140 and two feedback mirrors 142 with one of the feedback mirrors being partially transparent to serve as the output mirror, and a plurality of waveguide channels 144 is generally shown. For a waveguide length, $L_w$, of 55 cm, the total channel length, $L_c$, is approximately equal to 495 cm so that an aspect ratio of approximately 3 to 1 can be chosen for the width to height waveguide ratio and still obtain an acceptable mode quality for most applications. Depending upon the mode quality desired, a smaller or a larger $N_{fw}$ aspect ratio waveguide can be chosen by the laser designer under the teaching of this invention by trading off mode quality, output power, laser head design, etc. in the design of the laser.

Referring to FIG. 10B, a top view is shown of a ceramic waveguide 146 having a plurality of waveguide channels 144, acoustic pressure releasing slots 148 and holes 150 for ceramic indexing pins (not shown). Holes 152 are for the insertion of the fingers 218a of the RF shield 218 of FIGS. 15 and 16C. The ceramic waveguide 146 is positioned for assembly with hot and ground electrodes (not shown) in a hermetically sealed housing (not shown, but referred to in FIG. 10C). The configuration of FIGS. 10A and 10B should yield approximately 330 W of output power with 2250 W of RF input power and may be inserted into the laser head housing 210 of FIG. 10C shown in a cross sectional view.

Figure 10C:
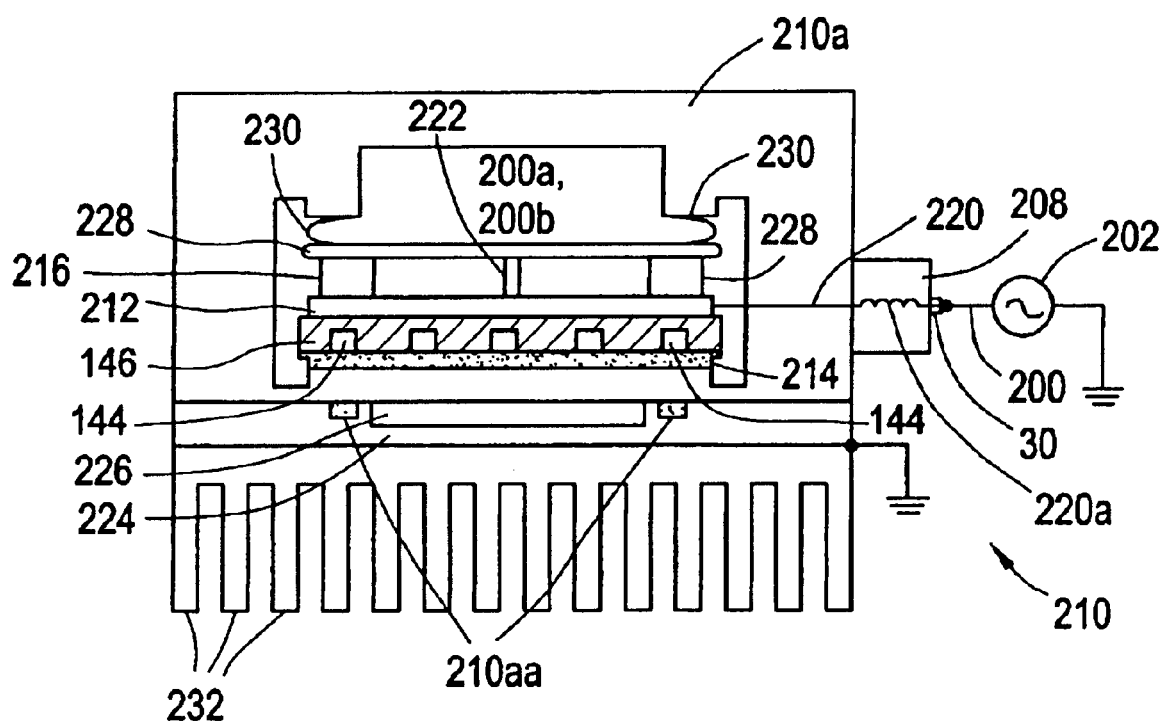
FIG. 10C is an end view of the folded waveguide structure of FIG. 10A and FIG. 10B inserted in a laser housing.

Referring to FIG. 10C, a laser head (or device) 210 has a one piece metal housing 210a which also acts as an electrical ground for the laser head. A hot metal electrode 212 electrically insulated from the metal housing 210a by a hermetically sealed connector 220, and a non-oxygen depleting, non-particulate generating ground metal RF electrode (e.g. Titanium) 214 in electrical contact with the metal housing 210a having the ceramic waveguide 146 disposed therebetween are positioned within housing 210a. Titanium (Ti) has a poor thermal conductivity when compared to aluminum and ceramic materials. Titanium possesses a native oxide ($TiO_2$) that has a low thermal coefficient of expansion that is dose to the host (Ti) metal thereby generating little or no particulate matter under alternate heating and cooling of the electrode. The reason for the use of a titanium electrode 214 in contact with the laser discharge is described in patent application Ser. No. PCT/US98/05055, RF Excited Waveguide Laser, by R. A. Hart, J. T. Kennedy, E. H. Mueller and & L. A. Newman; filed on Mar. 13, 1998 based on U.S. provisional patent application No. 60/041,092 filed on Mar. 14, 1997, which is incorporated herein by reference. FIG. 10C illustrates the positioning of the ceramic waveguide structure 146, with the titanium electrode 214 in contact with the laser discharge with the waveguide structure 146 on one side and the cooled aluminum laser housing 210a on the other, as described in patent application Ser. No. PCT/US98/05055. Heat is conducted from the waveguide structure 146 into the titanium electrode 214 and then into the aluminum housing 210a. Waveguide 146 has interconnected waveguide channels 144 defined therein having a prescribed length to width ratio in relation to a prescribed Fresnel number $N_f$. The waveguide structure 146 of FIGS. 10A and 10B is shown as an example but structures with fewer or larger numbers of folded waveguide channels 144 could also be used. An RF power supply 202 is connected to electrode 212 by a co-axial cable 200 through a vacuum sealed (hermetically sealed) RF connector 30 and a phase matching co-axial line 220a through the vacuum sealed (hermetically sealed) RF connector 220. The laser head 210a includes a heat exchanger in the nature of a cooling passage 226 operative to carry coolant therethrough and defined within a sealant plate 224 mounted to the laser head 210a. An O-ring seal 210aa is utilized to seal the coolant within the coolant passage 226. Alternatively the internal cooling passage 226 could be located in housing 210a and be sealed off by plate 224 using an O-ring. Air cooling can be accomplished through metal fins 232 in good thermal contact with the housing 210a (for lower power lasers). Fins 232 are preferably located at the bottom of the housing as shown, or by flowing a liquid or forced air through cooling passages 226, or by both as shown in FIG. 10C. Ceramic waveguide 146 overhangs, on all sides, electrodes 212 and 214, thereby preventing a discharge from forming between the edge of the top and bottom electrodes 212, 214. This overhang of waveguide 146 (or indentation of electrodes 212 and 214) assures that the electrical resistance between the electrodes 212, 214 along the surfaces of the ceramic waveguide 146 is greater than through the waveguide 146 at all points.

Figure 17A:
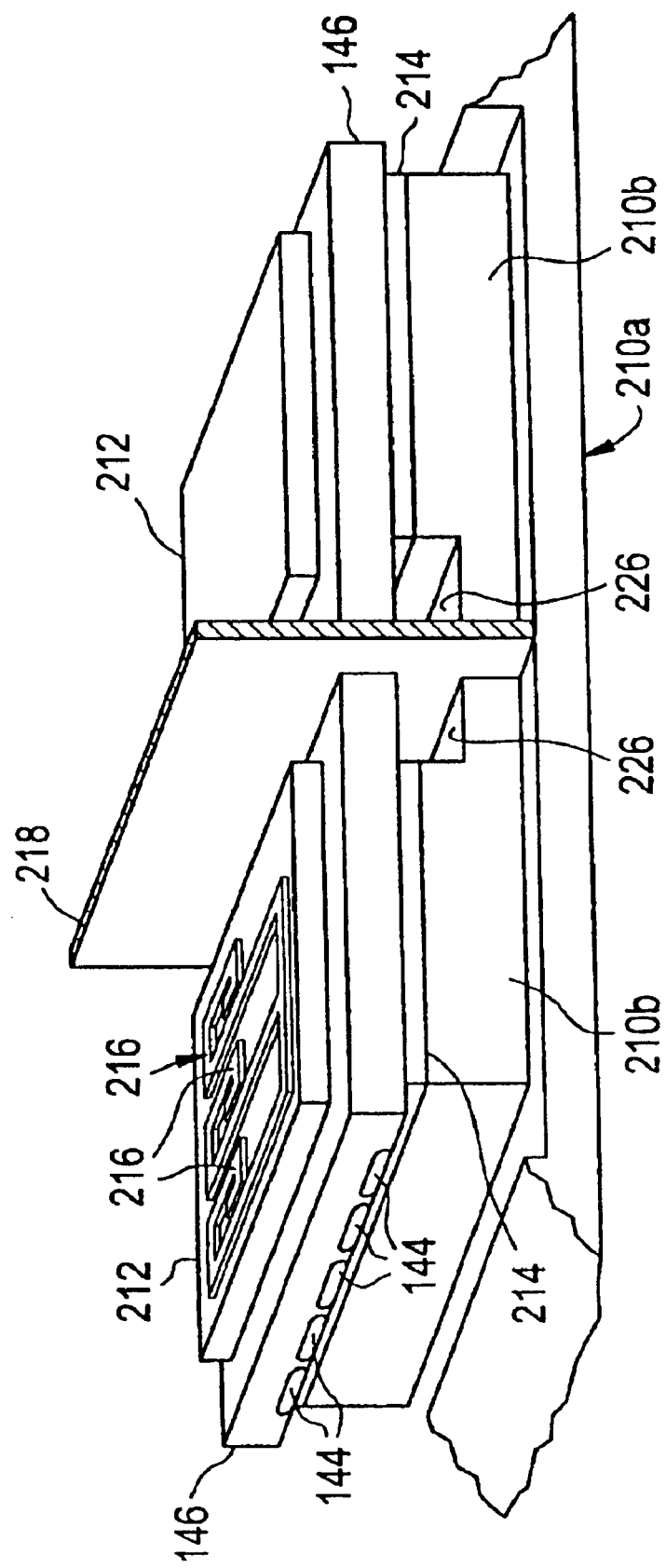
FIG. 17A is a three dimensional view of a segment of a split RF electrode discharge arrangement for a diffusion cooled waveguide laser with RF compartment isolation.
Figure 17B:
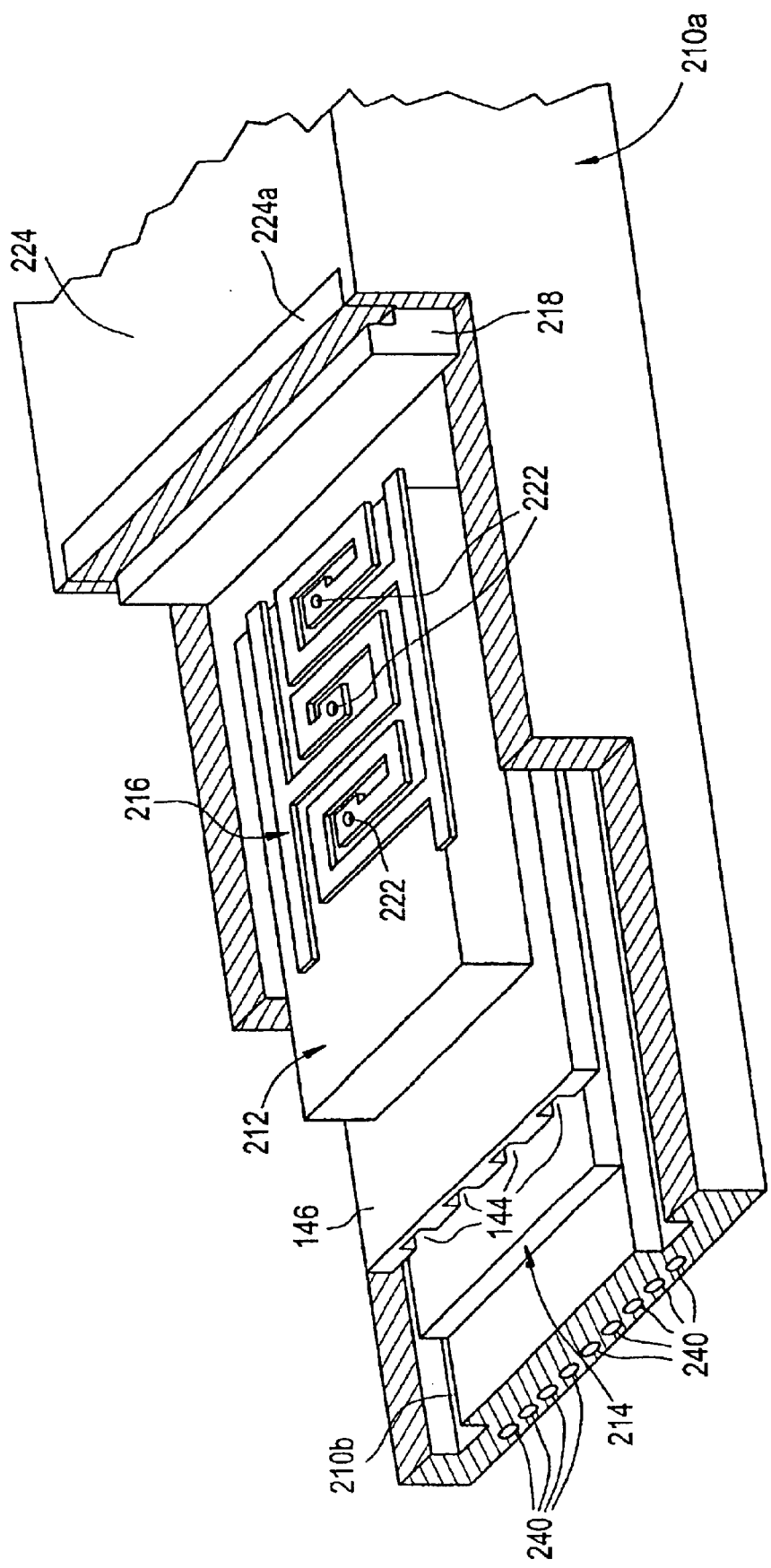
FIG. 17B is a three dimensional cutaway view of one compartment of a split RF electrode discharge for the diffusion cooled waveguide laser of FIG. 17A.

In FIGS. 10C, 17A and 17B, a distributed inductance assembly 216, as used in the prior art is positioned above electrode 212 and supported by a ceramic spacer 228 and by an electrically conductive post 222. One end of the distributed inductance assembly 216 is electrically connected to electrode 212 by the stiff electrical connecting post 222. The other end of the distributed inductance assembly 216 is connected by a metal C-spring 230, to the metal housing 210a which serves as a electrical ground. Laser 210 employs a clamping scheme in which the external clamping plate used in the prior art U.S. Pat. No. 4,787,090, is eliminated. It is replaced by an arrangement consisting of the continuous C-spring 230 (made from a resilient material such as gold plated Beryllium Copper) in combination with ceramic spacer 228. The C-spring 230 provides both a well defined clamping force and a low inductance electrical connection of the inductor assembly 216 to the metal housing 210a. This arrangement has advantages over the prior art where the laser housing is used as a flexible clamp because the laser housing needs to be rigid in order to obtain good laser beam pointing stability and to provide a laser housing that is insensitive to vibrations. This arrangement provides a clamping force which is very uniform and has a magnitude which does not result in fracture of the ceramic components. Furthermore, this clamping arrangement does not require the thinning of the housing 210a thereby improving the stiffness and resulting alignment stability relative to conventional designs. In addition, ceramic spacer 228 is a simple, two piece component and has a lower cost than the ceramic component used in the prior art. In addition, the C-springs 230 are used as electrical connectors to ground as well as to structurally hold internal laser parts together in contrast to the prior art that only uses C-springs to hold optical parts together.

In FIG. 10A, the distance, D, between adjacent waveguide channels 144 is determined by the length, $L_w$, of the ceramic waveguide structure 146 and the angle, θ, formed where two channels 144 of the waveguide 146 join together. As θ becomes larger the folding mirrors 140 and reflecting mirror 142 and output transmitting mirror 142a (not shown in FIG. 10B) need to be positioned closer to the end of the waveguide structure 146 and the positioning of the mirrors 140, 142, 142a from the end of the waveguide 146 (distance "$d_4$" in FIG. 10A) becomes increasingly sensitive in order to obtain low loss. As the angle θ, formed by the joining of two waveguide channels 144 of the folding waveguide 146, becomes smaller, the mirrors 140, 142, 142a can be placed further away from the end of the waveguide structure 146 without suffering excessive losses and the positioning of the referenced mirrors from the end of the waveguide structure 146 becomes much less sensitive. The sensitivity of the position of the mirrors 140, 142, 142a from the end of the waveguide structure 146 for obtaining low loss thence diminishes. Angles of between about 3 and 10 degrees are recommended to obtain simultaneously low loss per reflection ($\leq 0.5\%$) and small sensitivity of the mirror position from the end of the waveguide structure 146. A position variation of +/−0.020 inches in mirrors 140, 142 and 142a will not result in high optical losses when angles of approximately 3 to 4 degrees are used. This is a considerable advantage over the teaching of U.S. Pat. No. 5,610,936 where much larger angles are disclosed. A laser built upon the teaching of U.S. Pat. No. 5,610,936 had 90 degree angles of reflection and experienced 50% loss after thirtyfive reflections in a six meter long waveguide gain length with mirror positioning sensitivity of approximately several thousandths of one inch.

Figure 13A:
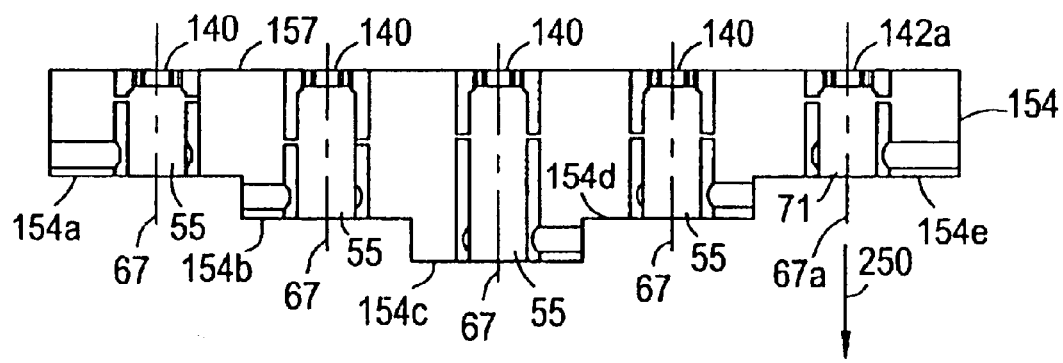
FIG. 13A is a first sectional view of the mirror housing of FIG. 12.
Figure 13B:
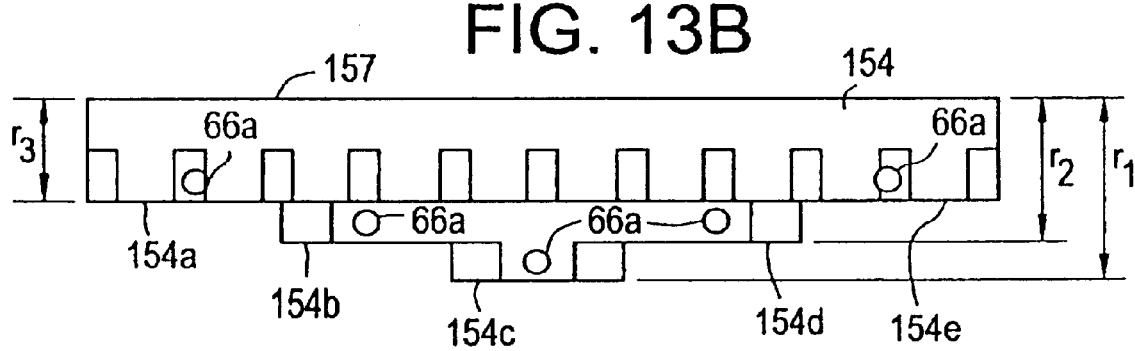
FIG. 13B is a top view of the mirror housing of FIG. 12.
Figure 13C:
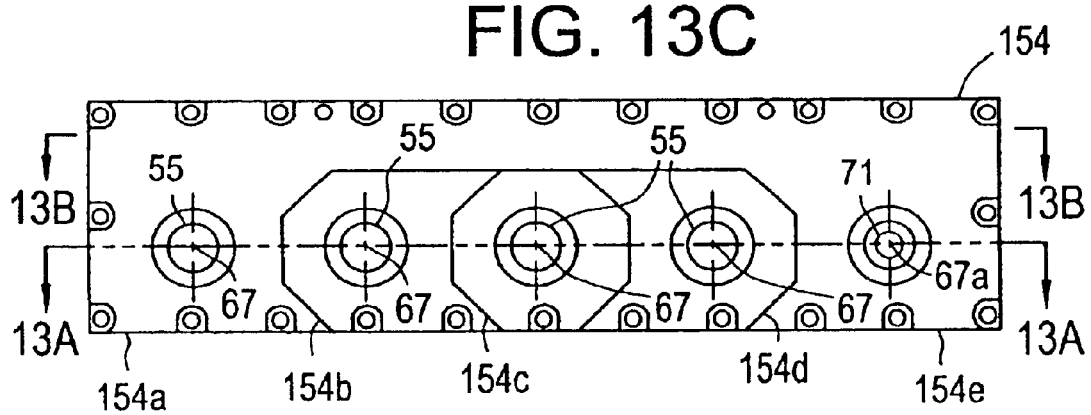
FIG. 13C is a second end view of the mirror housing of FIG. 11A.

Maintaining small angles (e.g. less than about 10 degrees) between adjacent folded waveguide channels 144 in FIG. 10A is desired because of a smaller structural width, s, and because of much less sensitivity of the position of the folding mirrors 140 with respect to the waveguide structure 146 that makes the assembly and alignment of the laser resonator easier. Unfortunately, the same angles result in a small distance, D, between adjacent mirrors which makes it difficult to provide means for adjusting the alignment of the mirrors 140, 142, 142a to align the laser resonators. One solution to this problem is the mirror assembly of FIGS. 11, 12 and 13.

To accommodate the additional mirrors 140, 142, 142a, a newly invented mirror housing 154 is provided as seen in FIGS. 11A, 11B, 12 and 13A–13C. The mirror housing 154 is attached at each end of the laser housing 210a of FIG. 10C so as to align the reflecting mirrors 140 and output mirror 142a relative to the waveguide channels 144 of the "N3V" waveguide configuration 138 of FIG. 10A. A metal O-ring seal xx is positioned between the laser housing 210a and each of the mirror housings 154. The invention differentiating the mirror holder of FIGS. 11, 12 and 13 over the mirror holder of patent application Ser. No. PCT/US98/05055 is the step-up pyramidal shape which provides the needed space required to adjust the tilting of the reflecting mirrors 140 for resonator alignment for the small angle desired between adjacent intersecting channels 144 of the folded waveguide configuration in order to obtain the low loss per reflecting mirror 140.

Figure 11A:
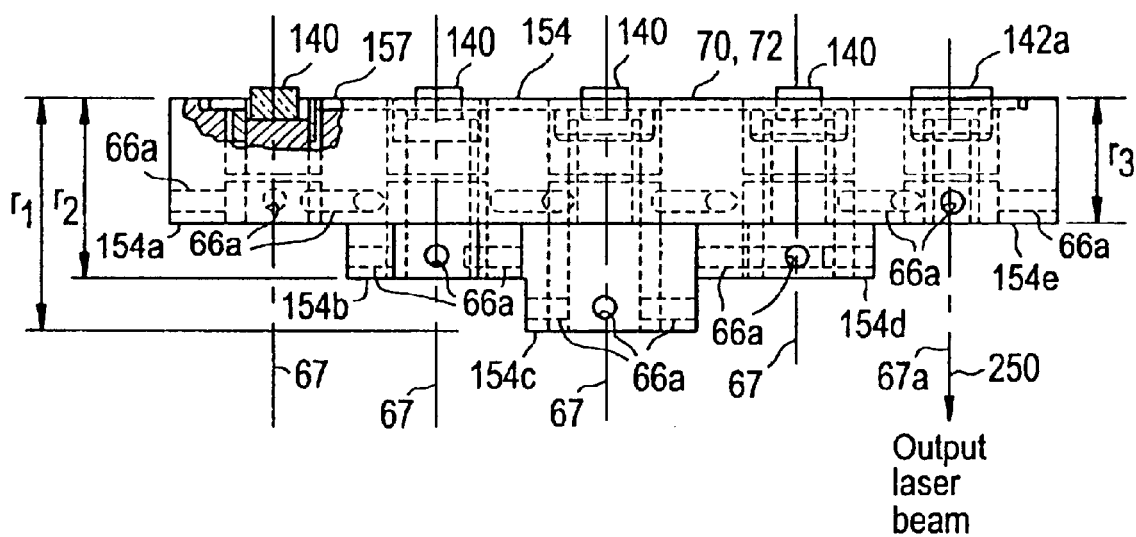
FIG. 11A is a top view of a mirror housing for the folded waveguide structure of FIG. 10A and FIG. 10B that goes on each end of the laser housing of FIG. 10C.
Figure 11B:
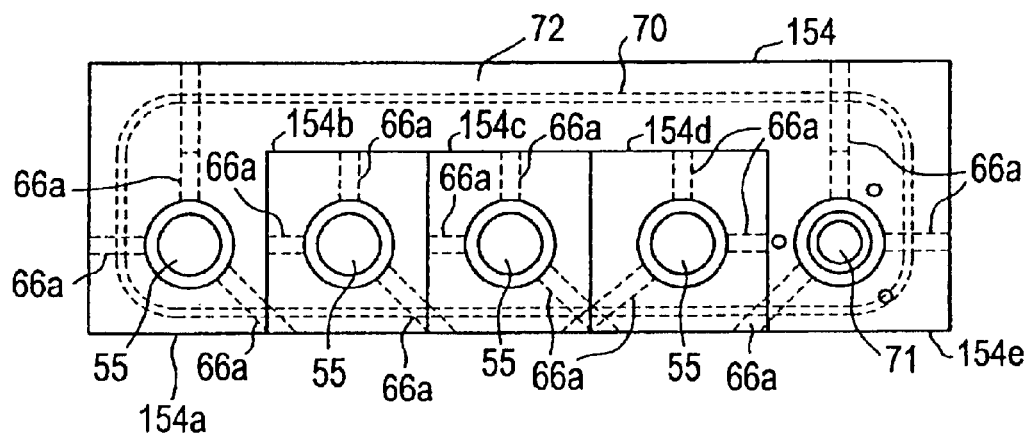
FIG. 11B is a first end view of the mirror housing of FIG. 11A.
Figure 11D:
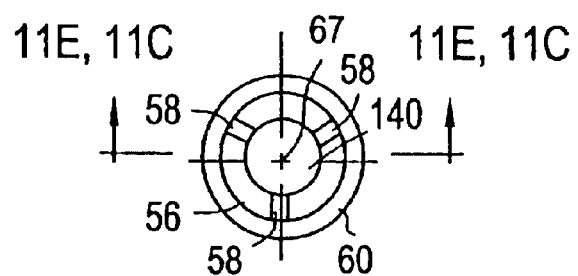
FIG. 11D is an end view of a reflecting mirror optical component mount machined directly within the mirror housing of FIGS. 11A and 11B mount in accordance with the present invention.
Figure 11C:
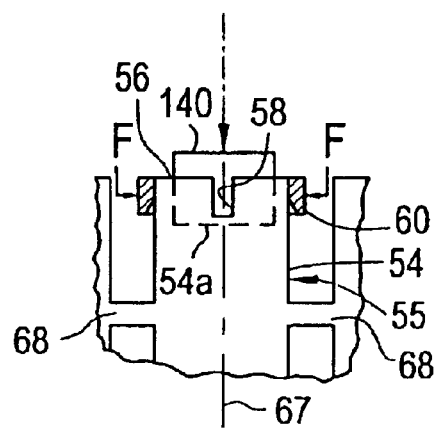
FIG. 11C is a first side view of a reflecting mirror optical component mount machined directly within the mirror housing of FIGS. 11A and 11B in accordance with the present invention.
Figure 11E:
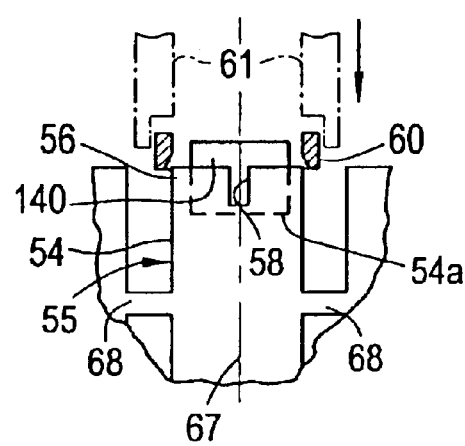
FIG. 11E is a second side view of a reflecting mirror optical component mount in accordance with the present invention.

Referring to FIGS. 11C–11E, an improved optical mirror mount, in accordance with patent application Ser. No. PCT/US98/05055 and used in the present invention, is generally shown at 55 for the highly reflecting folding mirrors 140, 142 and the transmitting mirror 142a of FIG. 21. Reflecting mirror mount 55 is made up of a post 54 having a plurality of spaced tabs 56 extending away from the post 54 and parallel to the longitudinal axis 67 of the post 54 defining a receptacle 54a at one end of the post 54. An optical component such as a reflecting mirror 140 or 142 (usually a coated metal reflecting mirror) is placed within the receptacle 54a of the post 54 and is surrounded by tabs 56 separated by spaces 58. A compression ring 60 is then placed around the tabs 56 and driven by an appropriate tool 61 of FIG. 11E along the longitudinal axis 67 of the post. This forces the tabs 56 to act as a spring exerting a force about the circumference of the post 54 towards the reflecting mirror 140 and secures the mirror 140 to the post 54 within the receptacle 54a. The forces on the mirror 140 are in the radial direction as shown by the arrows labeled "F" in FIG. 11C. Accordingly, deformation of the surface of the mirror 140 is minimized. Optical mount 55 is machined directly into the one piece mirror housing assembly 154. A metal web 68 is part of the single piece mirror housing assembly 154 and maintains a hermetical seal between the lower pressure inside the laser housing 210a and the atmospheric pressure outside the laser. Further, multiple optical mounts 55 may be employed in a single end wall of the laser, for example, in folded resonator lasers. In previous designs, the resonator mirrors 140, 142 were usually attached using a press-on cap that applied an axial force to the optical component. For cooling purposes, firm intimate contact of the backside of the optical mirror component is required with the end mirror housing 154. Unfortunately without very careful preparation of all mounting surfaces, deformation of the substrate will result, ruining the optical component's surface figure. One approach used to circumvent this problem has been to mount the optical component against a classic three-point contact on the end of the post. This approach, however, compromises the thermal aspects of the design.

These problems are overcome by optical mount 55, as the retaining forces applied to the reflecting mirror 140 of FIGS. 11C, 11D and 11E and reflecting mirrors 140 of FIG. 10A, by the mount 55 are applied radially rather than axially and this force is applied well behind the front surface of the reflecting mirror 140. Axial forces that are not applied evenly across the face of an optical component result in deformation of its surface. Radial forces on the other hand, as shown in FIG. 11C, are applied parallel to the plane of the surface of the mirror 140 and therefore have a much smaller effect on it's surface. In addition, the radial gripping force is applied well in back of the front surface of the mirror 140 further isolating the deforming forces from the front surface of the mirror 140. From a thermal design aspect, the greatest thermal resistance occurs at the boundary between the mirror 140, 142 and post 54 and is minimized as the interface area is increased, the surface finish is improved and the coupling load is increased. The optical mount 55 of the present invention improves thermal conduction of the mirror 140, 142 because the area of contact and the coupling lead can be greater than what can be achieved with the prior art method of mounting. From a cost stand point, much less surface preparation and skill is required, to effectively secure the optical component to the mount without distortion. The optical mount 55 is machined directly into the mirror housing assembly 154 as illustrated in FIGS. 11A, 11B, 12 and 13.

Figure 20:
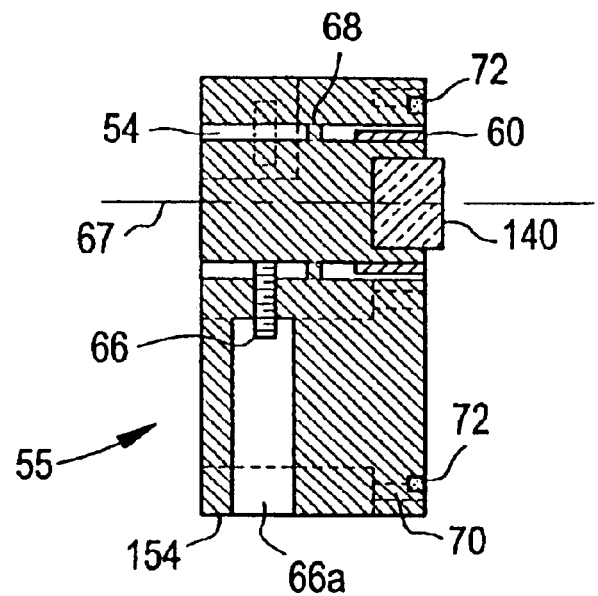
FIG. 20 is a cross sectional view of a reflecting mirror optical component machined directly within the end mirror housing assembly of FIGS. 11A and 11B and 13A–C in accordance with the present invention.

Referring to FIG. 20, a sectional view of the optical mount 55 is shown. A plurality of optical mounts 55 may be machined into a one piece mirror housing assembly 154 to provide the reflective surfaces at each end of a waveguide channels 144. The orientation of post 54 (and thereby reflecting mirror 140) is adjusted using set screws 66 through access ports 66a, thereby tilting the post about the flexing point 68 shown in FIGS. 11C, 11E and 21. The flexing point 68 consists of a web of material and also serves to isolate the interior of the laser head from the outside air and allows post 54 to flex.

A groove 70 (FIG. 11B) is formed in the face of the mirror housing assembly 154 with a gasket 72 provided to form a vacuum seal between the mirror housing assembly 154 and the laser head assembly 210a of FIG. 10C. An indium wire can be used, for example, as the gasket 72 to form a metal-to-metal seal between the mirror housing assembly 154 and the laser head assembly 210a. It is understood that other metals may be used to form the gasket. Metal-to-metal sealing is preferred for hermetical seals instead of rubber gaskets because of out gassing problems associated with rubber gaskets which contaminates the laser gas and limits the operating life time of the laser.

Figure 21:
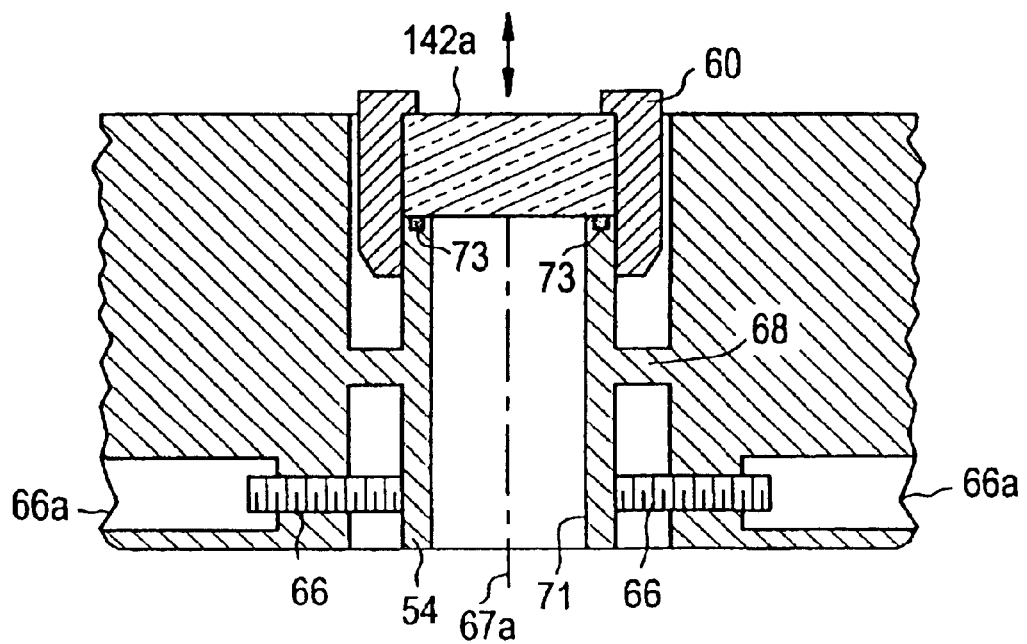
FIG. 21 is a cross sectional view of a transmitting mirror optical component mounting for a laser output mirror machined directly within the end mirrors housing assembly of FIGS. 11A, 11B 12 and 13A–13C in accordance with the present invention.

Referring to FIGS. 11A, 11B and 21, for the partially reflecting mirror 142a, through which the laser beam is extracted, a hole 71 is provided through the post 54 of the mirror mount 55, thereby allowing the laser beam to travel through the post 54 (see FIG. 21). Compression ring 60 of FIG. 21 holds mirror 142 to the post 54. Gasket 73 prevents the interior of the laser head 210a from contacting the ambient air on the outside of the laser head 210a. Again, a metal O-ring 73 is preferred for post 54. The position of post 54 is adjusted in the same fashion with respect to the posts shown in FIGS. 11A and 11B, by set screws 66 through access ports 66a.

FIGS. 11A and 11B illustrate a solution to the problem of providing room for the three set screws 66 for each reflecting folding mirror 140, 142 and for the transmitting output mirror 142a when there exists a small angle, θ(FIG. 10A), between the two intersecting waveguide channels 144 (FIG. 10A) when a large number of waveguide folds exist. A plurality of mirror holding compartments, 154a, 154b, 154c, 154d, 154e is provided for a plurality of optical mounts 55. A center compartment 154c for an odd number of optical mounts 55 of the mirror assembly holder 154 is extended a distance, $r_1$, from a common surface 157 along which the mirror housing 154 is mounted to the laser head 210a, as shown in FIGS. 11A, 11B, 12 and 13. In this example, the center compartment 154c is equipped with a longer post 54. Access to set screws 66 is available (FIGS. 11A, 11B and 12) at access ports 66a, whereby the mirrors 140, 142, 142a can be adjusted for alignment of the laser resonator as described hereinbefore. Alternatively, a larger angle, θ, between adjacent intersecting waveguide channels 144 results in a wider laser configuration which in turn results in more clearance between the set screws 66. A wider laser is not as attractive as a narrower laser in the marketplace. In addition, a larger angle, θ, between adjacent intersecting waveguide channels 144 results in a greater sensitivity of the positioning of the mirrors 140, 142, 142a the distance $d_4$ from the end of the ceramic structure 146 containing the waveguide channels 144. The mirror housing 154 approach typically illustrated in FIGS. 11A and 11B can be extended to waveguide lasers consisting of two or more W folded waveguides connected together, or a "NV" waveguide or an "N3V" ("NVVV") waveguide as shown in FIG. 10A.

In the mirror housing 154 a step up pyramidal shape is provided comprising the plurality of compartments 154a, 154b, 154c, 154d, 154e displaced from the laser housing 210a by the prescribed distances, $r_1, r_2, r_3$ in order to provide space and access thereto for the set screws 66 and to perform the required adjustments to align the laser resonator. The adjustments to the set screws 66 move the cylindrical rod portion 54 (FIGS. 20 and 11C) of the mirror housing 154 holding the mirrors 140, 142. Threading these set screws 66 in and out provides the means for aligning the mirrors 140, 142 as described in patent application Ser. No. PCT/US98/05055.

Figure 14:
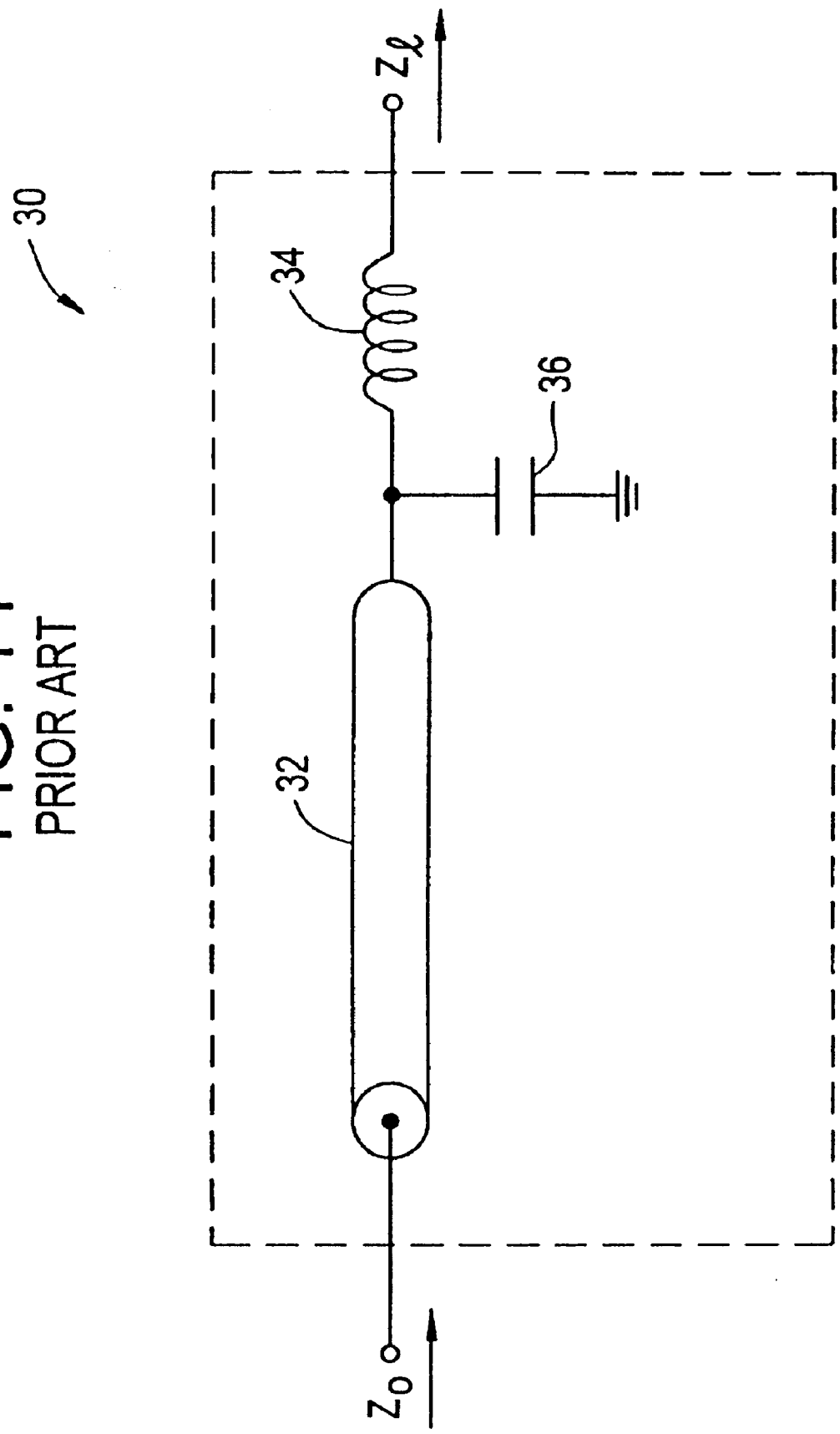
FIG. 14 illustrates a prior art impedance and phase matching network.

As the waveguide of a diffusion cooled waveguide gas laser such as a $CO_2$ laser continues to increase in length and width to obtain higher power as suggested above, the electrical impedance seen by the RF electronics driving the electrodes energizing the discharge within the rectangular waveguides continues to drop when the discharge is energized with increases in discharge volume. Eventually the impedance drops so far below 50 ohms that the transition from a high impedance (when the discharge is unlit within the waveguide), to a very low impedance (when the discharge is lit) makes it difficult to impedance match both the unlit and lit conditions with a simple two component matching network 30 as illustrated in FIG. 14. In FIG. 14, a coaxial cable 32 is used for phase matching. The size of the inductor 34, and capacitor 36, are determined by the well known process utilizing Smith Charts as found for instance in Chapter 10 of Electronic applications of the Smith Chart in Waveguides, Circuits and Component Analysis; by Philip H. Smith; Reprint edition, 1983, Robert E. Krieger Publishing Co., Inc., Malabar, Fla., which is incorporated herein by reference.

As the impedance decreases, the electrical Q of the two-component impedance matching network 30 of FIG. 14 used to match the impedance $Z_0$ of the RF power supply to the laser discharge impedance $Z_1$, increases. This causes the circulating currents within the impedance matching network 30 to increase. This increase in circulating currents in turn requires a larger inductor, 34/capacitor 36 combination to handle the larger currents, which increases the cost. In addition, increased circulating currents tend to lead toward reduced reliability. When the impedance becomes too low under the lit discharge conditions, it becomes more difficult to ignite the discharge with the simple delay line and two-component matching network 30 of FIG. 14. One can utilize three or four component matching networks for low impedance matching situations but this adds complexity and cost. One can also utilize a small UV lamp and its separate electronics circuit or a very small radioactive source to pre-ionize the gas to ensure the discharge is lit, also at increased cost and complexity.

One way to avoid the disadvantages referred to above is to utilize split electrodes for larger volume discharge (and thus higher power) diffusion cooled waveguide lasers. Split electrodes reduce the discharge volume energized by each of the electrodes. The reduced discharge volume for the individual electrode increases the lit discharge impedance seen by the RF electronics driving that specific electrode. The impedance increase is in proportion to the number of individual electrodes into which a single electrode is divided. The splitting of the electrodes also offers the advantage of utilizing identical lower power solid state RF power supplies. Such lower power RF supplies are produced in higher volume and in many cases, at lower cost, than higher power RF supplies. The higher cost for the higher power RF supplies occurs because of the lower number of units produced.

At present, there are no known split electrode RF excited $CO_2$ diffusion cooled, waveguide lasers contained in a single laser housing being sold as commercial products. Split electrode DC excited lasers and RF excited lasers having configurations of FIG. 1A, which are not waveguide lasers in nature, and may or may not utilize gas flow cooling, are presently commercially available. The advantages of the split electrode approach is more compelling for diffusion cooled waveguide gas lasers utilizing solid state RF power supplies. The unique methods of implementing the split electrode for diffused cooled, RF excited waveguide lasers that are manufacturable at lower cost and in a small rugged package while avoiding RF coupling between the split electrodes are also the subject of this invention. This invention addresses means of reducing the aforementioned light off difficulty for large area laser discharges driven with parallel electrode structures while also decreasing the RF circulating currents caused by the increased capacitance that scales directly with the area of the waveguide containing structure. This invention also addresses a technique for igniting large area RF discharges without the need for separate gas ignition circuits.

Figure 16A:
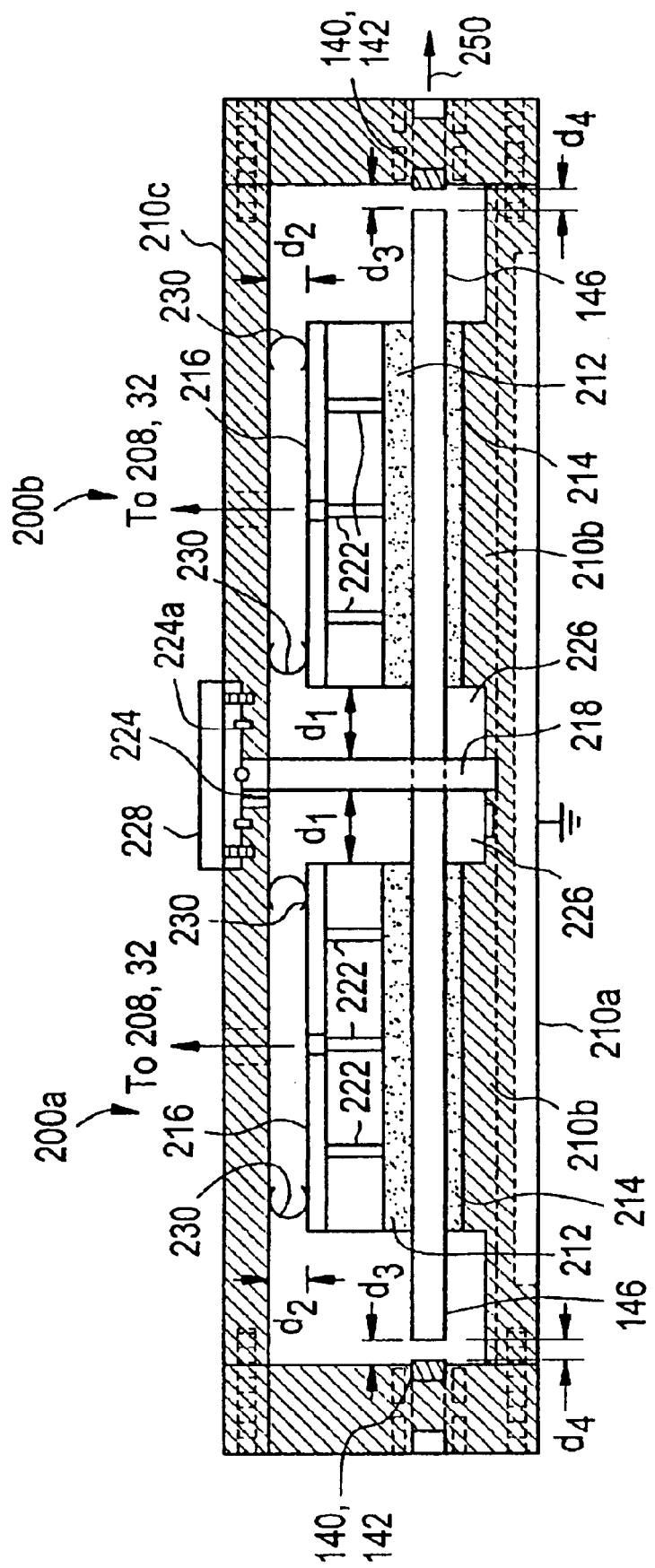
FIG. 16A is a side view of a split RF electrode discharge for a diffusion cooled waveguide laser.
Figure 16C:
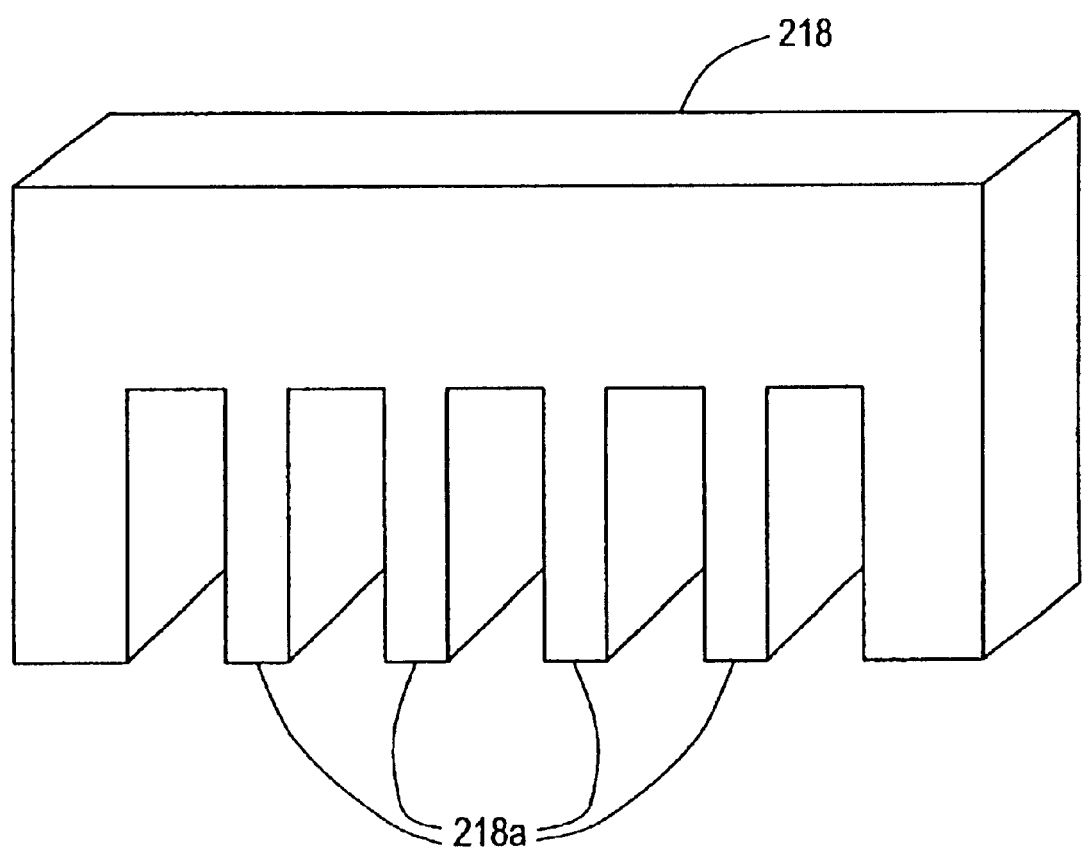
FIG. 16C is a three dimensional view of a RF shield including fingers.

Referring to FIG. 15A, a first embodiment for realizing a split RF electrode discharge for a diffusion cooled waveguide laser 200 utilizing two separate RF power supplies 208 is generally shown. The power supplies 208 comprise an oscillator 202, a preamplifier 204 and a power amplifier 206. The hermetically sealed laser housing 210a comprises first and second compartments 200a, 200b separated by an RF shield 218 (FIG. 16C). Within each of the compartments 200a, 200b, there is provided a hot electrode 212 connected to a power supply 208 and a ground electrode 214 electrically connected to the grounded laser housing 210a. Distributed spiral inductors 216 are also provided in each of the compartments 200a, 200b. A waveguide is provided at 146 which extends through both compartments 200a, 200b and the RF shield 218. The folding configurations of the waveguide 146 can be as illustrated, for example, by FIG. 2A or 2B or FIG. 10A or may comprise an even larger number of channels 144 not shown. Each of the spiral inductors 216 is used to tune out the capacitance formed by each of the pair of electrodes 212, 214 which sandwich the single dielectric waveguide structure 146 in both compartments 200a, 200b. The waveguide structure 146 includes the waveguide channels 144 (not shown) having a prescribed width to length ratio in relation to a prescribed Fresnel number. The waveguide laser 200 includes the mirror housing 154 as seen in FIGS. 11A, 11B, 12, 13A–13C and the mirror holding post structures 54 of FIGS. 11C–11E, 20 and 21 machined as part of mirror housing 154. To electrically isolate the pairs of hot electrodes 212 from one another and to thereby prevent RF coupling therebetween while yet maintaining a close spacing between the ends of the pairs of electrodes 212, 214, the RF shield 218 is placed therebetween as depicted in FIGS. 15A, 15B, 16A, 16B, 16C, 17A and 17B. A distance, $d_1$, seen in FIG. 16A, is maintained between both the distributed spiral inductors 216, the hot electrodes 212 and the ground electrode 214 and the RF grounded shield 218 so as to prevent electrical arching between these elements in the separate compartments 200a, 200b and the grounded RF shield 218. This distance is determined by the potential difference existing between the ends of the inductors 216, of the hot electrodes 212, the ground electrode 214, and the surface of the RF shielding plate 218. In addition, a distance $d_2$ is maintained between the distributed spiral inductors 216 and the laser housing 210. Furthermore, a distance $d_3$ is maintained between the ends of the waveguide structure 212 and the laser housing 210a. A plurality of holes 152 in the ceramic waveguide structure 146, illustrated in FIG. 10B for an "N3V" waveguide configuration, allows for the insertion of metal fingers 218a, machined as part of the bottom of the RF shield, 218 through these holes 152 into the grounded metal laser housing 210a to provide electrical isolation internal to the waveguide structure 146. The plurality of fingers 218a may be either circular or rectangular or any convenient cross sectional shape and the holes 152 are of a complimentary cross sectional shape to receive the fingers 218a. In some cases, this RF isolation plate provided by the metal fingers 218a inserted into the ceramic waveguide structure 146 may not be needed especially if the two RF power supplies 208 are driven in phase by a common RF oscillator 202 as shown in FIG. 15B. FIG. 16C illustrates the metal RF shield plate 218 including the fingers 218a.

The use of two separate RF power sources 208 as seen in FIG. 15A may in some cases cause a problem because they are typically out of phase with each other. This out of phase condition between the multiple RP power supplies 208 may cause a higher potential difference to ground on one side of the RF shield 218 than on the other side. This potential difference will cause ground circulating currents to be generated, which can cause RF coupling between the two regions which will necessitate increasing the distance $d_1$ of FIG. 16A. If this is found to be a problem, then the use of a common oscillator 202 and preamplifiers 204 can be used to drive separate power amplifiers 206 as shown in a second embodiment in FIG. 15B. This will ensure that each pair of split electrodes 212, 214 will be driven in phase. In addition, the power output of each of the power amplifiers 206 can be adjusted to be equal so that no potential differences exist between each side of the RF shield 218. Good electrical contact is to be made between the RF shield 218 and the grounded laser housing 210. The output of the waveguide laser 200 in FIGS. 15A and 15B is in the nature of a laser beam 250. The laser beam 250 is directed to an optical beam shaping mechanism (not shown) for beam shaping if required.

A schematic side view of the diffusion cooled waveguide laser 200 is illustrated in FIG. 16A and a top view thereof in FIG. 16B. Note that an "NV" type folding configuration of FIG. 2B is shown in 16B for illustrative purposes only. Other multiple folding configurations may be used as well, such as the "N3V" ("NVVV") waveguide structure 146 of FIGS. 10A and 10B.

In FIGS. 16A and 17B an opening 224 is provided in the upper surface 210c of the housing 210a. This opening 224 has two purposes. One purpose is to provide for a recession 226 to be machined into the raised bottom surface 210b of the housing 210a that supports the ground electrodes 214 as shown in FIG. 16A. The recession 226 enables the ends of the ground electrodes 214 to be machined so the distance, $d_1$, is maintained to prevent arcing and also for the hot electrode 212 to be coterminous with the ends of the ground electrode 214 and thus to terminate at the same location as the ground electrode 214, thereby preventing a discharge from occurring at the ends of the electrodes 212, 214 within the gas ballast volume within the respective compartments 200a, 200b of the housing 210a. The other purpose of the opening 224 is to allow for the insertion of the RF shielding plate 218 through the opening 224 as shown in FIG. 16A and for providing a good electrical ground contact between the RF shield 218 and the grounded housing 210a. A cover 228 is provided over the opening 224. A metal O-ring seal 224a is used between the cover 228 and the housing 210 to obtain a hermetical seal while obtaining good electrical contact between the RF shield 218 and the cover 228 to electrical ground through the housing 210a. RF power is applied to the laser through a coiled, phase matching coaxial cable delay line 32, which is in turn connected to a capacitor 36/inductor 34 network 30 such as that shown FIG. 14. The coiled coaxial cable 32 and the two component LC network 30 are contained within a grounded RF enclosure 230 to prevent RF leakage to the outside world as illustrated in FIGS. 15A, 15B, 18A, 18B, 18C and 19B.

Figure 18A:
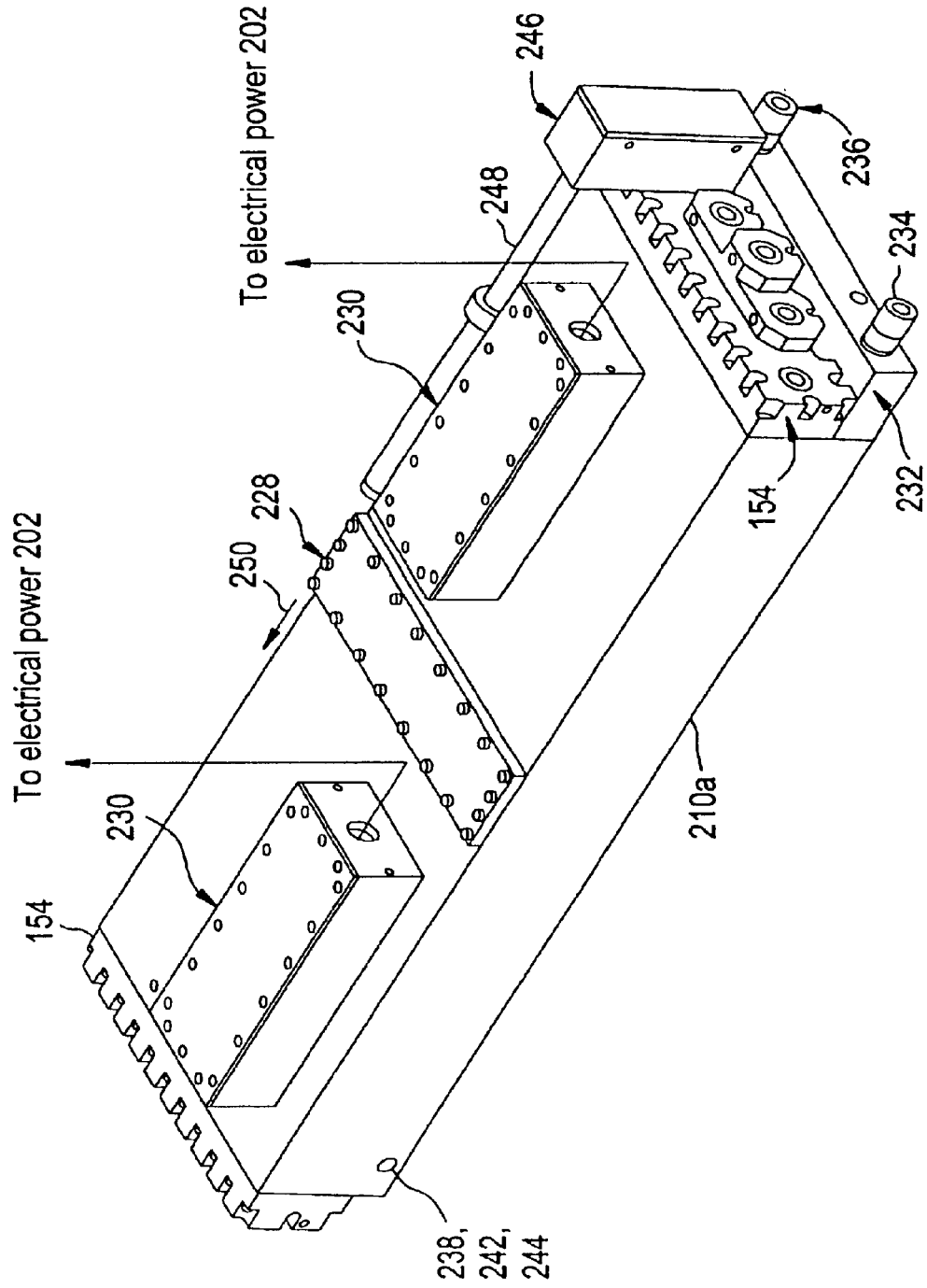
FIG. 18A is an isometric representation of the housing of the diffusion cooled waveguide laser of FIGS. 17A and 17B.

Referring to FIGS. 17A and 17B, internal structural details in schematic form for the hermetically sealed laser housing 210a containing the split electrodes 212, 214 are generally shown. FIG. 18A illustrates an isometric drawing of the high power diffusion cooled waveguide laser housing 210a including an impedance matching network housing 230 disposed on top of the cooled, hermetically sealed laser housing 210a for each of the two split RF electrodes 212, 214 (not shown). If more than two RF split electrodes 212, 214 are used then more than two impedance matching housings 230 are also used. In FIG. 18A the RF shielding cover 228 over the opening 224 (not shown) through which the RF shielding plate 218 (not shown) is inserted, is shown along with the two fivemirror housing units 154 mounted on each end of the housing 210a. The five-mirror housing units 154 shown are for the "N3V" waveguide configuration as illustrated in FIGS. 10A and 10B. Liquid cooling passages 240 (not shown in FIG. 18A but shown in FIG. 17B) are provided in the bottom of the housing 210a directly underneath the ground electrode supporting structure 210b portion of the housing 210a. FIGS. 18A, 18B, 18C, 19A and 19B illustrate a plenum liquid cooling chamber 232 including an inlet, 234 and an outlet 236 for the cooling liquid connected to the bottom of the housing 210*a*. One approach is to connect together the individual cooling passages 240 at the opposite end of the housing 210*a* by providing a cross connecting passage 242 at the opposite end of the housing 210*a* and then plugging the outer inlet 238 with a plug 244 as shown in FIG. 18A. If a more even flow through each of the cooling passages 240 is required, than this simple approach allows, the alternative of providing a second plenum chamber (not shown) at the opposite end of the housing 210*a* in place of the cross connecting cooling passage 242 with the plug 244 is always available. FIG. 18A also shows a vertical periscope housing 246 mounted to the laser housing 210*a* and containing two angled reflecting mirrors (not shown) that direct the laser output beam 250 to the top of the laser housing 210*a* as illustrated in patent application Ser. No. PCT/US98/05055. The laser beam 250 is then directed to a beam shaping optical arrangement 248 that converts the elliptical shaped beam emitted by the rectangular cross sectional waveguide 146 into a circular beam as described in patent application Ser. No. PCT/US98/05055.

Referring to FIGS. 18B and 18C, a top and side view of the high power RF split electrode diffusion cooled waveguide laser housing 210*a* is shown. FIG. 19A illustrates a top down view inside of the laser housing 210*a* with the top 210*c* removed. The spiral inductors 216 on each of the two hot electrodes 212 along with the RF shielding plate 218 separating the two hot electrodes 212 are shown. In the example of FIG. 19A, two side-by-side distributed inductors 216 are shown for each of the two pairs of electrodes 212, 214 instead of one row of inductors. FIG. 19B illustrates an end view of the laser housing 210*a* where the laser beam 250 is emitted.

Thus, based upon the foregoing description of the present invention it will be appreciated that the techniques addressed by this invention can allow waveguide lasers to compete with slab lasers in the 100 W to 500 W ranges and can benefit the operation of both the normal slab and the inverted slab laser configurations. This invention raises the output power capability of waveguide diffusion cooled gas lasers into the higher power region of slab lasers. Utilizing the techniques revealed in this invention, an output power between 150 to 170 Watts is obtained from the "NV" laser waveguide configuration.

It will be understood that a person skilled in the art may make modifications to the preferred embodiments shown herein within the scope of the claims. While the present invention has been described as carried out in a specific embodiment thereof, it is not intended to be limited thereby but intended to cover the invention broadly within the scope and spirit of the claims.

What is claimed is:

1. A laser structure comprising:
   an elongated, dielectric waveguide structure having a plurality of waveguide channels therein, said waveguide channels including a gaseous gain medium;
   a pair of electrodes including a first electrode extending along a first elongated surface of the waveguide structure and a second electrode extending along a second elongated surface of the waveguide structure, the first elongated surface being opposite and parallel to the second elongated surface, each of said first and second electrodes being divided into spaced apart first and second electrode portions, each of said spaced apart first and second electrode portions of said first electrode being electrically connectable to an RF power supply for applying an RF potential across said gain medium;
   a metal housing enclosing said waveguide structure and said pair of electrodes, with said first electrode being electrically isolated from said metal housing; and
   a metal shield located between said spaced apart first and second portions of each of said first and second electrodes, the metal shield being positioned orthogonal to said first and second elongated surfaces so as to prevent RF coupling between said spaced apart first and second portions.

2. The laser structure of claim 1 wherein said spaced apart first and second portions of said second electrode are electrically connected to said metal housing.

3. A laser structure comprising:
   a laser resonator having a resonator axis;
   an elongated dielectric waveguide structure having a plurality of waveguide channels therein, said waveguide channels including a gaseous gain medium, and said resonator axis extending through said plurality of waveguide channels;
   a pair of electrodes including a first electrode extending along a first elongated surface of the waveguide structure and a second electrode extending along a second elongated surface of the waveguide structure, the first elongated surface being opposite and parallel to the second elongated surface, each of said first and second electrodes being divided into spaced apart first and second electrode portions, each of said spaced apart first and second electrode portions of said first electrode being electrically connectable to an RF power supply for applying RF energy to said gain medium, thereby causing laser radiation to circulate in said laser resonator as guided by said waveguide channels;
   a metal housing enclosing said waveguide structure and said pair of electrodes, with said first electrode being electrically isolated from said metal housing; and
   a metal shield located between spaced apart first and second portions of each of said first and second electrodes transverse to said waveguide structure to prevent RF coupling between said spaced apart first and second portions, said metal shield being electrically isolated from said first electrode and electrically connected to said metal housing.

4. The laser structure of claim 3, wherein said metal housing is grounded.

5. The laser structure of claim 3 wherein said spaced apart first and second portions of said second electrode are each electrically connected to said metal housing.

6. The laser structure of claim 3, wherein said metal shield is in the form of an elongated metal plate having a plurality of spaced-apart metal fingers extending therefrom, with spaces between said metal fingers arranged to allow passage therethrough of laser radiation guided by said waveguide channels.

7. The laser structure of claim 6, wherein said metal fingers extend through holes in said waveguide structure.

8. The laser structure of claim 7, wherein said shield is located at a predetermined distance from said spaced apart first and second portions of said first and second electrodes, said predetermined distance being selected to prevent electrical arcing between said spaced apart first and second portions of said first and second electrodes.

9. A laser comprising:
   a laser resonator having a resonator axis;
   an elongated dielectric waveguide structure having a plurality of waveguide channels therein, said waveguide channels including a gaseous gain medium, and said resonator axis extending through said plurality of waveguide channels;

an RF power supply;

a pair of electrodes including a first electrode extending along a first elongated surface of the waveguide structure and a second electrode extending along a second elongated surface of the waveguide structure, the first elongated surface being opposite and parallel to the second elongated surface, each of said first and second electrodes being divided into spaced apart first and second electrode portions, each of said spaced apart first and second electrode portions of said first electrode being electrically connected to said RF power supply for applying RF energy to said gain medium, thereby causing laser radiation to circulate in said laser resonator guided by said waveguide channels;

a metal housing enclosing said waveguide structure and said first and second electrodes, with said first electrode being electrically isolated from said metal housing; and a metal shield located between spaced apart first and second portions of each of said first and second electrodes transverse to said waveguide structure to prevent RF coupling between said spaced apart first and second portions, said metal shield being electrically isolated from said first electrode and electrically connected to said metal housing.

10. The laser of claim 9, wherein said metal shield is in the form of an elongated metal plate having a plurality of spaced-apart metal fingers extending therefrom, with spaces between said metal fingers arranged to allow passage of laser radiation guided by said waveguide channels.

11. A laser comprising:

a laser resonator having a resonator axis;

an elongated dielectric waveguide structure having a plurality of waveguide channels therein, said waveguide channels including a gaseous gain medium, and said resonator axis extending through said plurality of waveguide channels;

a pair of electrodes including a first electrode extending along a first elongated surface of the waveguide structure and a second electrode extending along a second elongated surface of the waveguide structure, the first elongated surface being opposite and parallel to the second elongated surface, each of said first and second electrodes being divided into spaced apart first and second electrode portions;

a metal housing enclosing said waveguide structure and said pair of electrodes, with said first and second electrode portions of said first electrode being electrically isolated from said metal housing, and said first and second electrode portions of said second electrode being electrically connected to said metal housing;

first and second RF power supplies, said first portion of said first electrode being electrically connected to said first RF power supply, and said second portion of said first electrode being electrically connected to said second RF power supply for applying RF energy to said gain medium, thereby causing laser radiation to circulate in said laser resonator guided by said waveguide channels; and a metal shield located between spaced apart first and second portions of each of said first and second electrodes transverse to said waveguide structure to prevent RF coupling between said spaced apart first and second portions, said metal shield being electrically isolated from said first electrode and electrically connected to said metal housing.

12. The laser of claim 11, wherein said metal shield is in the form of an elongated metal plate having a plurality of spaced-apart metal fingers extending therefrom, with spaces between said metal fingers arranged to allow passage of laser radiation guided by said waveguide channels.

13. The laser of claim 11, wherein said first and second RF power supplies share a common oscillator and at least one preamplifier, whereby each of the first and second electrodes can be driven in phase.

\* \* \* \* \*